US007313125B2

(12) United States Patent
Hori et al.

(10) Patent No.: US 7,313,125 B2
(45) Date of Patent: Dec. 25, 2007

(54) OFDM DEMODULATION METHOD AND SEMICONDUCTOR INTEGRATED CIRCUIT DEVICE

(75) Inventors: Toyokazu Hori, Kodaira (JP); Hiroshi Nogami, Fujisawa (JP); Toshihito Habuka, Tamamura (JP); Naoto Inokawa, Takasaki (JP); Kazuyuki Takada, Kawaguchi (JP)

(73) Assignee: Renesas Technology Corp., Tokyo (JP)

( * ) Notice: Subject to any disclaimer, the term of this patent is extended or adjusted under 35 U.S.C. 154(b) by 651 days.

(21) Appl. No.: 10/809,898

(22) Filed: Mar. 26, 2004

(65) Prior Publication Data

US 2004/0264432 A1 Dec. 30, 2004

(30) Foreign Application Priority Data

Mar. 31, 2003 (JP) ............................. 2003-094842

(51) Int. Cl.
*H04L 5/04* (2006.01)
*H04L 12/26* (2006.01)
(52) U.S. Cl. ...................... 370/343; 370/207; 370/208; 370/252; 370/342; 375/340; 375/346; 375/316; 455/67.11; 455/67.13
(58) Field of Classification Search ................ 370/343, 370/204, 208, 252, 342; 375/340, 346, 316; 455/67.11, 67.13, 63.1
See application file for complete search history.

(56) References Cited

U.S. PATENT DOCUMENTS

| 2001/0033601 | A1* | 10/2001 | Nafie et al. .................. 375/132 |
| 2003/0174790 | A1* | 9/2003 | Ho et al. ..................... 375/340 |
| 2003/0227875 | A1* | 12/2003 | Wei et al. .................... 370/252 |
| 2004/0198265 | A1* | 10/2004 | Wallace et al. ............. 455/118 |
| 2004/0233838 | A1* | 11/2004 | Sudo et al. .................. 370/208 |
| 2004/0240376 | A1* | 12/2004 | Wang et al. ................ 370/204 |
| 2006/0176968 | A1* | 8/2006 | Keaney et al. .............. 375/260 |

FOREIGN PATENT DOCUMENTS

JP 06-326739 11/1994

* cited by examiner

*Primary Examiner*—William Trost
*Assistant Examiner*—Julio Perez
(74) *Attorney, Agent, or Firm*—Miles & Stockbridge P.C.

(57) ABSTRACT

The invention comprises: processing for receiving an OFDM packet having a preamble and the following data transmission symbol, in which packet the subcarrier interval of the preamble is set wider than that of the data transmission symbol; processing for estimating a DC offset occurring at a receiving side by using the received preamble; processing for correcting the DC offset on the received data transmission symbol, according to the estimation result of the DC offset; and processing for demodulating the DC offset corrected data transmission symbol. Thus, it is possible to estimate a DC offset and then correct the DC offset according to the estimated value, in the OFDM packet with no nul symbol defined there.

11 Claims, 18 Drawing Sheets

OFDM DEMODULATION METHOD AND SEMICONDUCTOR INTEGRATED CIRCUIT DEVICE

BACKGROUND OF THE INVENTION

The present invention relates to a digital transmission system by using the orthogonal frequency division multiplex (hereinafter, abbreviated as OFDM), and more particularly to an OFDM demodulation method for correcting a DC offset generated in the OFDM demodulator and a semiconductor integrated circuit using the same method.

Recently, the OFDM transmission method prevails as the transmission method for realizing a broadband digital communication such as digital television broadcast and wireless LAN. This OFDM transmission method is one of the multi-carrier transmission methods and it is a transmission method for performing the digital modulation on a plurality of mutually orthogonal subcarriers, and therefore, a broadband digital communication can be realized. The OFDM transmission method, however, requires high accuracy in demodulation of subcarriers because the interval of the frequencies of subcarriers is comparatively narrow. Especially the DC offset generated in an analog unit such as an A/D converter of the OFDM demodulator has an adverse effect on the demodulation of subcarriers, which deteriorates the performance of the OFDM demodulation. Therefore, it is extremely important to correct the DC offset and reduce the adverse effect in order to improve the performance of the OFDM demodulator.

In the conventional OFDM demodulator for correcting the DC offset, an OFDM signal with the channel central frequency mainly modulated is received by an antenna and supplied to an RF unit. The RF unit amplifies the received signal, and a frequency converter converts the signal of the channel central frequency into intermediate frequency and further converts it into the I signal and Q signal that are baseband signals, through the I/Q separation. The I signal and the Q signal converted into the baseband signals are analog signals and the respective signals are converted into time discrete and amplitude discrete digital signals by the A/D converter. The digital baseband signals are entered into a DC offset estimating unit of a baseband unit. The DC offset estimating unit has a function of estimating the DC offset generated in the A/D converter. For example, according to the technique disclosed in Japanese Patent Laid-Open No. 6-326739, the average voltage during the period of nul symbol included in the OFDM baseband signal is measured, thereby estimating the DC offset. Here, the nul symbol is to express a state of non-signal, and for example, in the wireless 1394 system (ARIB STD-T72) standardized by the Association of Radio Industries and Businesses, there exists a nul symbol at the head of the OFDM packet. According to this system, since the DC offset is always estimated by using the nul symbol included in the packet, the DC offset value suitable every packet can be obtained. The DC offset estimated by the DC offset estimating unit is supplied to a DC offset correcting unit so as to adjust a reference voltage of the A/D converter and correct the DC offset voltage. After finishing the correction of the DC offset, the signal supplied from the A/D converter passes through the DC offset estimating unit and enters the OFDM demodulator, and the input OFDM signal is demodulated by the OFDM demodulator, thereby to restore the data transmitted from the OFDM transmitter.

SUMMARY OF THE INVENTION

When demodulating the OFDM packet compliant with, for example, the IEEE802.11a that is the international standard of a wireless LAN by using the above-mentioned conventional technique, the following problems will be found by the present inventor.

Namely, a constitutional example of the general OFDM packet such as the IEEE802.11a-complicant packet will be shown. A preamble that is a fixed pattern is disposed at the head of the OFDM packet. The preamble is formed by one and more repetition of the fixed pattern having the minimum frequency Tp. Subcarriers are disposed in the amplitude spectrum of the I signal or the Q signal of the preamble in the baseband so that the interval between the adjacent subcarriers may be pxfs[Hz] when the subcarrier interval of the data transmission symbol described later is defined as fs. A signal is detected by using this preamble and continuously an antenna diversity control is performed.

A path estimation symbol that is a fixed pattern follows the preamble. A plurality of subcarriers are arranged in the amplitude spectrum of the I signal or the Q signal of the path estimation symbol in the baseband in a positive direction of the frequency from the frequency f=0[Hz], with the same intervals as the subcarrier intervals fs of the data transmission symbol.

A data transmission symbol follows the path estimation symbol. The amplitude spectrum of the data transmission symbol is formed similarly to the arrangement of the subcarriers in the amplitude spectrum of the path estimation symbol and the interval of the subcarriers is fs. In the standard of the IEEE802.11a, a data transmission symbol called a signal symbol and a data symbol follows the above path estimation symbol. In the signal symbol, the transmission rate of the packet and the packet length are described, and the data symbol is repeated for the number of the (N−1) times necessary for the data transmission shown by the packet length.

While the preamble and the path estimation symbol have the fixed pattern regardless of the packet, the data transmission symbol doesn't have a fixed pattern because the data transmitted through the OFMD packet is various.

Thus any nul symbol that means the non-signal period is not defined in the OFDM packet of the IEEE802.11a. In the packet communication as shown in the IEEE802.11a, it is impossible to know the arrival time of the OFDM packet previously. Accordingly, there is such a problem that the DC offset cannot be estimated directly from the nul symbol or the non-signal period out of the OFDM packet period.

An object of the invention is to provide an OFDM demodulation method capable of estimating a DC offset in the OFDM packet including no definition of the nul symbol and correcting the DC offset based on the estimated value.

Another object of the invention is to provide a semiconductor integrated circuit capable of improving the performance of the OFDM demodulation by using this OFDM demodulation method.

The above and other objects and new features of the invention will be apparent from the description of this specification and the accompanying drawings.

The outline of the typical ones of the invention disclosed in this specification will be briefly described as follows.

(1) An ODFM demodulation method according to the invention comprises: processing for receiving an OFDM packet including a preamble and the following data transmission symbol, in which packet the subcarrier interval of the preamble is set wider than that of the data transmission symbol; processing for estimating a DC offset occurring at a receiving side by using the input preamble; processing for correcting the DC offset on the received data transfer symbol, based on the estimation result of the DC offset; and processing for demodulating the DC offset corrected data transmission symbol. According to the above method, since the DC offset is estimated by using the preamble of the OFDM packet, it is possible to estimate a DC offset and then correct the DC offset according to the estimated value even when any nul symbol is not defined.

Taking the frequency offset into consideration, when the above method further comprises processing for correcting a frequency offset of the received preamble, in which the DC offset is estimated by using the frequency offset corrected preamble, it is possible to cancel the DC offset as well as the frequency offset and demodulate the data transmission symbol.

The DC offset estimation processing can be realized by performing the low pass filtering processing, for example, on the received preamble, with a passband narrower than the subcarrier interval of the preamble. When estimating a DC offset from the frequency offset corrected preamble, since the DC offset component (dci·sin $2\pi f0t$, dcq·cos $2\pi f0t$, dcq·sin $2\pi f0t$, dci·cos $2\pi f0t$) of the frequency offset corrected preamble is shifted in frequency, the periodicity $1/f0$ caused by the frequency shift of the DC offset component does not necessarily conform to the periodicity of the baseband signal. Therefore, when estimating the DC offset according to the simple average, it is impossible to decide the period for simple average because of the difference of the above periodicity, which makes it impossible to estimate the DC offset. Accordingly, in the DC offset estimation processing, low pass filtering processing may be performed on the frequency offset corrected preamble in situation that arbitrary time of getting the maximum output value of an oscillator for use in the frequency offset correction is set at zero and that the period of time is set at a range of $-T$ to $T$, with a passband narrower than the subcarrier interval of the preamble. Since the sin $2\pi f0$ is an odd function, the time average proves to be zero. According to the low pass filtering processing, the time average becomes zero as for the terms of dcq·sin $2\pi f0t$ and dci·sin $2\pi f0t$ and the DC offset can be estimated according to the time average as for the terms of the dcq·cos $2\pi f0t$ and dci·cos $2\pi f0t$.

An OFDM demodulation method from another viewpoint of the invention comprises: the first processing for receiving an OFDM packet in which the subcarrier interval of the preamble is set wider than that of the data transmission symbol; the second processing for estimating a frequency offset by using the received preamble and supplying a frequency offset estimated value; the third processing for correcting the frequency offset on the received preamble, according to the frequency offset estimated value; the fourth processing for estimating a DC offset by using the frequency offset corrected preamble and supplying a DC offset estimated value; the fifth processing for correcting the DC offset on the data transmission symbol, according to the DC offset estimated value; the sixth processing for correcting the frequency offset on the DC offset corrected data transmission symbol, according to the frequency offset estimated value; and the seventh processing for performing OFDM demodulation on the result of the sixth processing. The fourth processing includes, for example, the integral filtering processing.

(2) A semiconductor integrated circuit according to the invention is to receive and demodulate an OFDM packet including a preamble and the following data transmission symbol, in which packet the subcarrier interval of the preamble is set wider than that of the data transmission symbol, and it comprises: a DC offset estimating unit for estimating a DC offset occurring at a receiving side by using the received preamble; a DC offset correcting unit for correcting the DC offset on the received data transmission symbol, according to the estimation result of the DC offset; and a demodulating unit for demodulating the DC offset corrected data transmission symbol. Thus, since the DC offset is estimated by using the preamble of the OFDM packet, it is possible to estimate a DC offset and then correct the DC offset according to the estimated value even when no nul symbol is defined.

Taking the frequency offset into consideration, it further comprises a frequency offset correcting unit for correcting a frequency offset of the received preamble, in which the DC offset correcting unit estimates the DC offset by using the frequency offset corrected preamble.

The DC offset estimating unit includes a low pass filter for passing the frequency offset corrected preamble in situation that arbitrary time of getting the maximum output value of an oscillator for use in the frequency offset correction is set at zero and that the period of time is set at a range of $-T$ to $T$, with a passband narrower than the subcarrier interval of the preamble.

A semiconductor integrated circuit from another viewpoint of the invention has a frequency offset estimating unit, a frequency offset correcting unit, a DC offset estimating unit, and a DC offset correcting unit, for receiving and demodulating an OFDM packet in which the subcarrier interval of a preamble is set wider than that of the data transmission symbol. In the above circuit, the received OFDM signal is supplied to the frequency offset estimating unit, so to estimate a frequency offset and supply a frequency offset estimated value. The received OFDM signal is supplied to the frequency offset correcting unit, so to correct the frequency offset according to the frequency offset estimated value and supply a frequency offset corrected signal. The frequency offset corrected signal is supplied to the DC offset estimating unit, so to estimate a DC offset value and supply a DC offset estimated value. The frequency offset corrected signal is supplied to the DC offset correcting unit, so to correct the DC offset according to the DC offset estimated value.

DESCRIPTION OF THE PREFERRED EMBODIMENTS ((OFDM Demodulation Method))

The OFDM demodulation method according to the invention will be described. The OFDM demodulation method is a method for demodulating the OFDM packet compliant with, for example, the IEEE802.11a that is the international standard of wireless LANs (Local Area Network).

Figure 4:
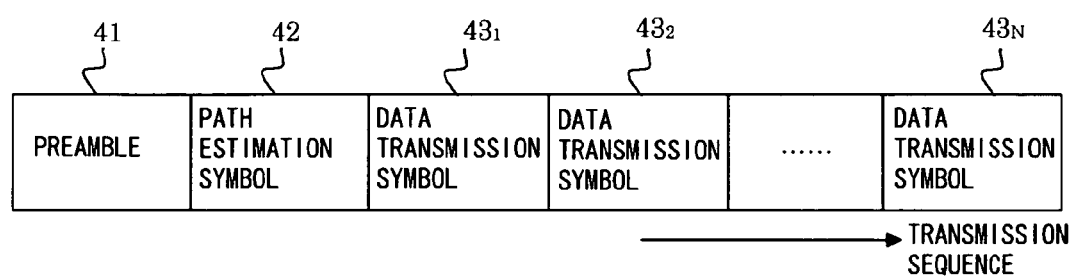
FIG. 4 is an explanatory view showing an example of the constitution of the OFDM packet.

FIG. 4 shows a constitutional example of a general OFDM packet including the IEEE802.11a-compliant packet. A preamble 41 that is a fixed pattern is arranged at the head of the OFDM packet. The preamble 41 is formed by one and more repletion of the fixed pattern having the minimum frequency Tp. FIG. 7A shows the amplitude spectrum of the I signal or the Q signal of the preamble 41 in the baseband and in the amplitude spectrum, the subcarriers are arranged so that the interval of the adjacent subcarriers may be pxfs[Hz] when the subcarrier interval of the data transmission symbol $43_N$ described later is defined as fs. Here, p is the natural number of 1<p, and in each subcarrier, any number will do as far as it satisfies 1<p. A signal is detected by the preamble 41 and continuously an antenna diversity control, an automatic gain control (Automatic Gain Control: hereinafter, abbreviated as AGC), frequency offset estimation, and timing synchronization are performed, hence to obtain a received signal of high S/N ratio at the OFDM demodulation. In the IEEE802.11a standard, this preamble 41 is called as a short symbol and fs=312.5[kHz] and p=4.

The path estimation symbol 42 having a fixed pattern follows the preamble 41. FIG. 7B shows the amplitude spectrum of the I signal or the Q signal of the path estimation symbol in the baseband, and a plurality of subcarriers are arranged in a positive direction of the frequency from the frequency f=0[Hz] with the same intervals as the intervals fs of the subcarriers of the data transmission symbol. In the IEEE802.11a standard, this path estimation symbol is called a long symbol and the standard describes that the frequency offset and the path are estimated at a high accuracy.

The data transmission symbols $43_1$, $43_2$, . . . , and $43_N$ (N is the natural number) follow the path estimation symbol 42. The amplitude spectrum of the data transmission symbol is arranged similarly to the arrangement of the subcarriers in the amplitude spectrum of the path estimation symbol 42 as shown in FIG. 7B, and the interval of the subcarriers is fs.

The data transmission symbol called a signal symbol and a data symbol follows the path estimation symbol called a long symbol, in the IEEE802.11a standard. In the signal symbol, the transmission rate of a packet and the packet length are described and the data symbol is repeated for the number of (N−1) times necessary to transmit the data shown by the packet length.

While the preamble and the path estimation symbol are of a fixed pattern regardless of packet, the data transmission symbol doesn't have a fixed pattern because the data to be transmitted by the OFDM packet are various.

As mentioned above, in the structure of the OFDM packet of the IEEE802.11a shown in FIG. 4, a nul symbol that is the non-signal period is not defined. It is impossible to know the arrival time of the OFDM packet in advance in a packet communication such as the IEEE802.11a standard. Accordingly, it is impossible to directly estimate a DC offset from the nul symbol or the non-signal period out of the OFDM packet period.

The OFDM demodulation method as described later is to enable estimation of a DC offset in the OFDM packet where no nul symbol is defined and to improve the performance of the OFDM demodulation by correcting the DC offset according to the estimated value.

On the condition for understanding the OFDM demodulation method, at first, generation of the frequency offset and the DC offset in the OFDM modulation and the OFDM demodulation will be described according to FIG. 5.

Figure 5:
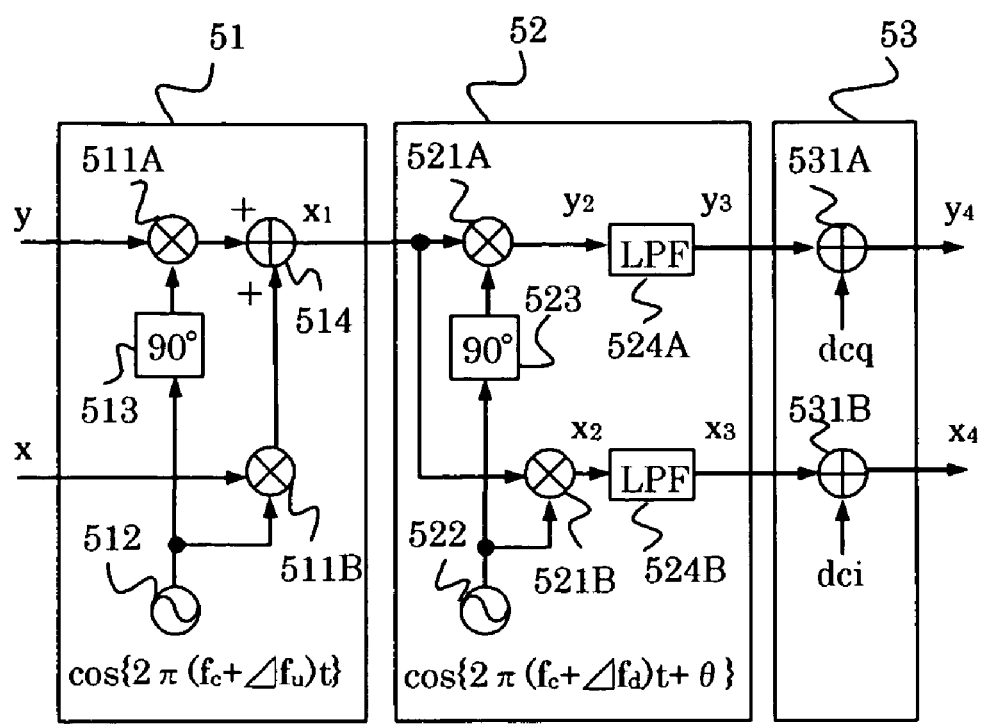
FIG. 5 is a block diagram for use in describing generation of a frequency offset and a DC offset.

The block diagram shown in FIG. 5 is formed by a transmitter up-conversion unit 51, a receiver down-conversion unit 52, and a receiver DC offset generator 53. There exists an aerial wire between the transmitter up-conversion unit 51 and the receiver down-conversion unit 52. The symbols shown in FIG. 5 are described as follows:

fc: channel central frequency

Δfu: error of the channel central frequency at an up-conversion

Δfd: error of the channel central frequency at a down-conversion f0: frequency offset (Δfd−Δfu)

θ: initial phase dci: I component of a DC offset dcq: Q component of a DC offset (x, y): I/Q signal of transmission baseband x1: signal obtained by up-converting the (x, y) transmission baseband signal (x2, y2): baseband I/Q signal obtained by down-converting the x1 signal (x3, y3): baseband I/Q signal after the (x2, y2) signal passes through the LPF (x4, y4): baseband I/Q signal with the DC offset added to the (x3, y3) signal In FIG. 5, the transmission baseband signal is subjected to the I/Q quadrature modulation and the frequency conversion to the channel central frequency in the OFDM transmitter up-conversion unit 51, the OFDM signal is subjected to the frequency conversion to the baseband signal and the I/Q quadrature demodulation in the OFDM receiver down-conversion unit 52 and converted into the baseband signal, which is that one with the DC offset added separately in the I signal and the Q signal in the receiver DC offset adding unit 53.

Figure 7:
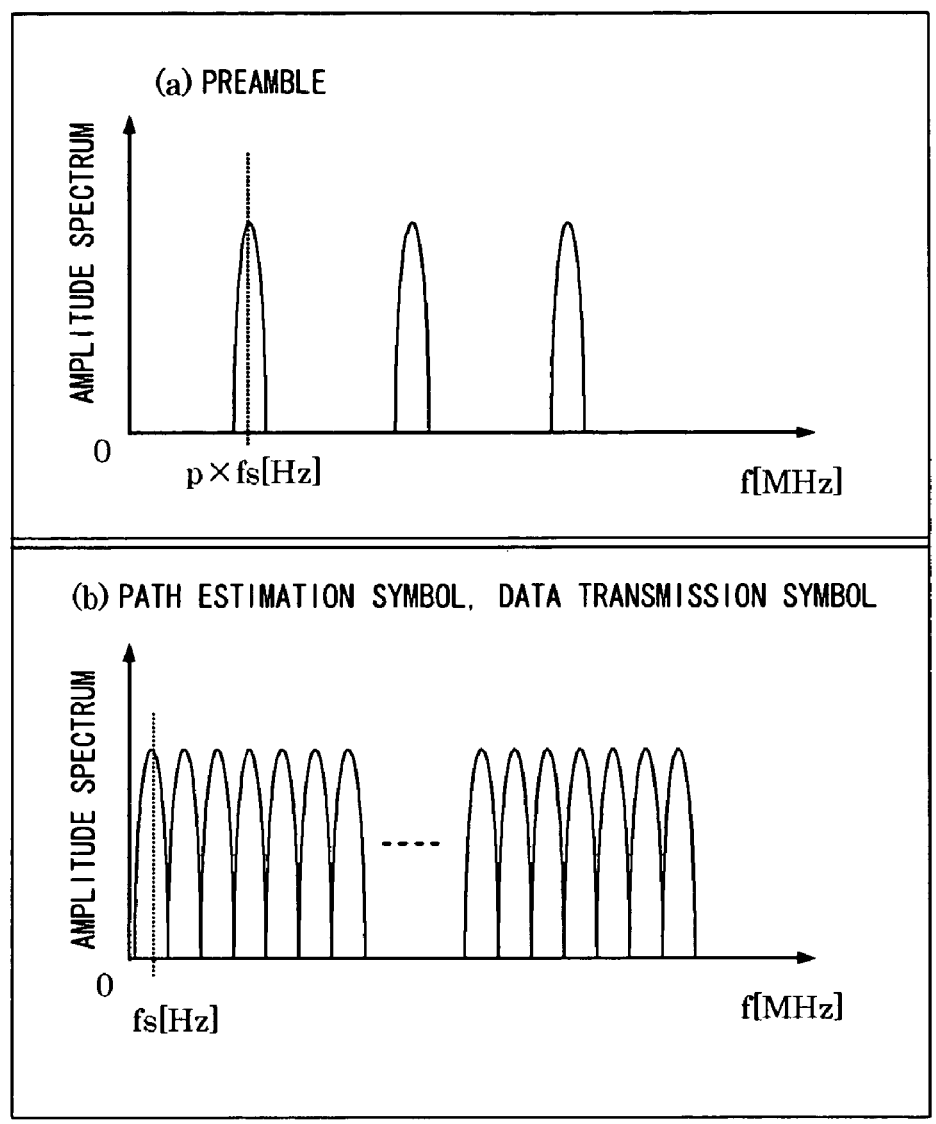
FIG. 7 is an explanatory view showing the amplitude spectrum of the baseband signal at a transmission time.

When the baseband I signal to be entered into the OFDM transmitter up-conversion unit 51 is defined as x and the baseband Q signal is defined as y (hereinafter, represented as (x, y)), the amplitude spectrum will be that one shown in FIG. 7 as mentioned in the structure of the OFDM packet of FIG. 4. The baseband I/Q signal (x, y) having the subcarrier arrangement shown in FIG. 7 is supplied to the OFDM transmitter up-conversion unit 51. The OFDM transmitter up-conversion unit 51 shown in FIG. 5 is formed by a multiplier 511A, a multiplier 511B, an oscillator 512, a 90° phase converter 513, and an adder 514. The I signal x of the entered baseband signal is multiplied by the output of the oscillator 512 in the multiplier 511B and the Q signal y of the entered baseband signal is multiplied by the output of the 90° phase converter 513 having a function of supplying a signal having the phase of the output signal of the oscillator 512 is shifted by 90°, in the multiplier 511A. A signal supplied from the multiplier 511A and the multiplier 511B are added to each other in the adder 514, hence to obtain an OFDM signal having been subjected to the I/Q quadrature modulation and the frequency conversion to the channel central frequency fc.

Generally there occurs an error of the channel central frequency Δfu at a transmission time in the frequency conversion, and therefore, the frequency of the oscillator 512 can be represented as fc+Δfu as shown in FIG. 5. The OFDM signal converted into the channel central frequency fc can be represented by the expression 1.

$$x_1(t) = x(t)\cos\{2\pi(f_c + \Delta f_u)t\} - y(t)\sin\{2\pi(f_c + \Delta f_u)t\} \quad \text{[expression 1]}$$

As for the error of the channel central frequency Δfu, its tolerance is defined as 20 [ppm] of the channel central frequency in the IEEE802.11a standard, and when the channel central frequency fc=5 [GHz], Δfu=100 [kHz] and so.

The OFDM signal X1 supplied from the OFDM transmitter up-conversion unit 51 is supplied to the OFDM receiver down-conversion unit 52. The OFDM receiver down-conversion unit 52 is formed by a multiplier 521A, a multiplier 521B, an oscillator 422, a 90°0 phase converter 523, and a low pass filter (hereinafter, referred to as LPF) 524A and an LPF 524B. The OFDM signal with the input channel central frequency defined as the central frequency is branched into two, and after the one OFDM signal branched is multiplied by the output of the oscillator 522 in the multiplier 521B, it is entered into the LPF 524B and the baseband I signal is supplied therefrom. The other OFMD signal branched is multiplied by the output of the 90° phase converter 523 having a function of supplying a signal resulting from 90° shifting in phase of the output signal of the oscillator 522, in the multiplier 521A, and then, it is entered into the LPF 524A and the baseband Q signal is supplied therefrom.

Figure 3:
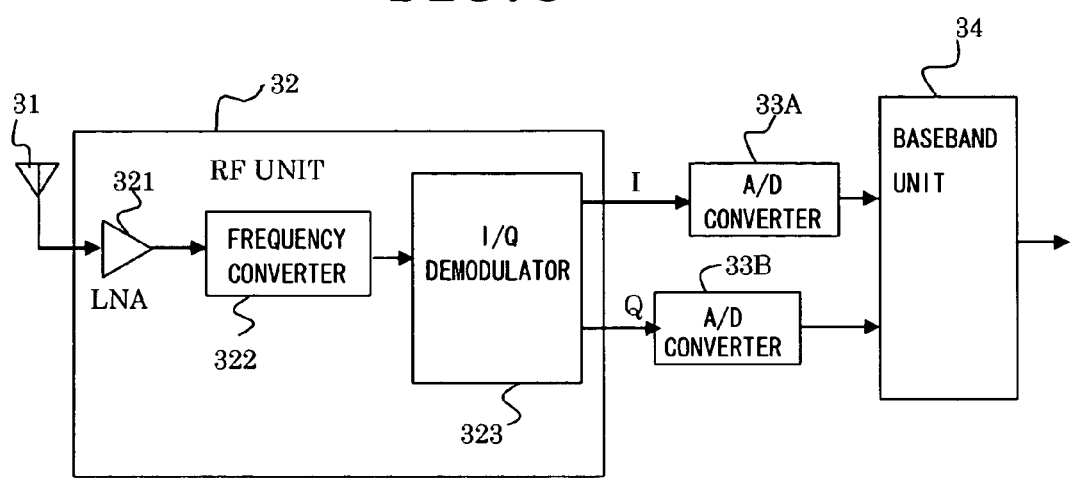
FIG. 3 is a block diagram showing the details of the RF unit in the OFDM demodulator.

The receiver down-conversion unit 52 is generally formed by an RF unit 32 shown in FIG. 3 as an example. Namely, the OFDM signal obtained by mainly modulating the channel central frequency is received by an antenna 31 and entered into an LNA 321 of the RF unit 32 from the antenna 31. The LNA is an abbreviation of Low Noise Amplifier, and it has a function of amplifying the received signal and the output of the LNA is supplied to a frequency converter 322. The frequency converter 322 has a frequency converting function of converting the signal of the channel central frequency into intermediate frequency and its output is supplied to the I/Q demodulator 323. The I/Q demodulator 323 has a function of separating the I/Q from the signal converted into intermediate frequency and converting it into the I signal and the Q signal that are the baseband signals.

In the OFDM receiver down-conversion unit 52 of FIG. 5, the signal is subjected to the frequency conversion to the baseband width of the OFDM signal and the I/Q demodulation and converted into the baseband I/Q signal (x2, y2).

At this time, since the channel frequency error Δfd occurs at the frequency conversion also in the OFDM receiver similarly to at the time of transmission, the frequency of the oscillator 522 can be represented as fc+Δfd as shown in FIG. 5 and as a result, the baseband signal (x2, y2) can be represented by the following expression 2.

$$\begin{aligned}
x_2(t) &= x_1(t)\cos\{2\pi(f_c + \Delta f_d)t + \theta\} \quad \text{[expression 2]}\\
&= 1/2[x(t)\cos\{2\pi(2f_c + \Delta f_u + \Delta f_d)t + \theta\} + \\
&\quad x(t)\cos\{2\pi(\Delta f_d - \Delta f_u)t + \theta\} - \\
&\quad y(t)\sin\{2\pi(2f_c + \Delta f_u + \Delta f_d)t + \theta\} + \\
&\quad y(t)\sin\{2\pi(\Delta f_d - \Delta f_u)t + \theta\}]
\end{aligned}$$

$$\begin{aligned}
y_2(t) &= -x_1(t)\sin\{2\pi(f_c + \Delta f_d)t + \theta\}\\
&= 1/2[-x_1(t)\sin\{2\pi(2f_c + \Delta f_u + \Delta f_d)t + \theta\} - \\
&\quad x(t)\sin\{2\pi(\Delta f_d - \Delta f_u)t + \theta\} - \\
&\quad y(t)\cos\{2\pi(2f_c + \Delta f_u + \Delta f_d)t + \theta\} + \\
&\quad y(t)\cos\{2\pi(\Delta f_d - \Delta f_u)t + \theta\}]
\end{aligned}$$

Generally, since the value of Δfd is the same as that at the transmission time, Δfd=100 [kHz] and so, for example, in the case of the IEEE802.11a standard. Since the channel central frequency error occurs in the frequency conversion at the transmission time as well as at the receiving time as mentioned above, its difference of Δfd-Δfu becomes a frequency distortion occurring in the baseband I/Q signal (x2, y2) having been received. When this distortion is defined as the frequency offset f0, it may take plus and minus values since the both Δfu and Δfd are errors. Accordingly, in the case of the IEEE802.11a, the frequency offset value f0 becomes about 200 [kHz] and so at maximum.

The baseband I/Q signals having been subjected to the frequency conversion and the I/Q demodulation in the OFDM receiver down-conversion unit 52 are entered respectively into the LPF 524A and the LPF 524B. The LPF 524A and the LPF 524B have each function of removing an unnecessary signal in the other portion than the baseband width generated at a time of frequency conversion and I/Q demodulation and the resultant signals turn to be the signals with the frequency component 2fc removed therefrom, as illustrated in the following expression 3.

$$\begin{aligned}
x_3(t) &= x(t)\cos\{2\pi(\Delta f_d - \Delta f_u)t + \theta\} + \quad \text{[expression 3]}\\
&\quad y(t)\sin\{2\pi(\Delta f_d - \Delta f_u)t + \theta\}\\
&= x(t)\cos(2\pi f_0 t + \theta) + y(t)\sin(2\pi f_0 t + \theta)
\end{aligned}$$

$$\begin{aligned}
y_3(t) &= -x(t)\sin\{2\pi(\Delta f_d - \Delta f_u)t + \theta\} + \\
&\quad y(t)\cos\{2\pi(\Delta f_d - \Delta f_u)t + \theta\}\\
&= -x(t)\sin(2\pi f_0 t + \theta) + y(t)\cos(2\pi f_0 t + \theta)
\end{aligned}$$

Figure 8:
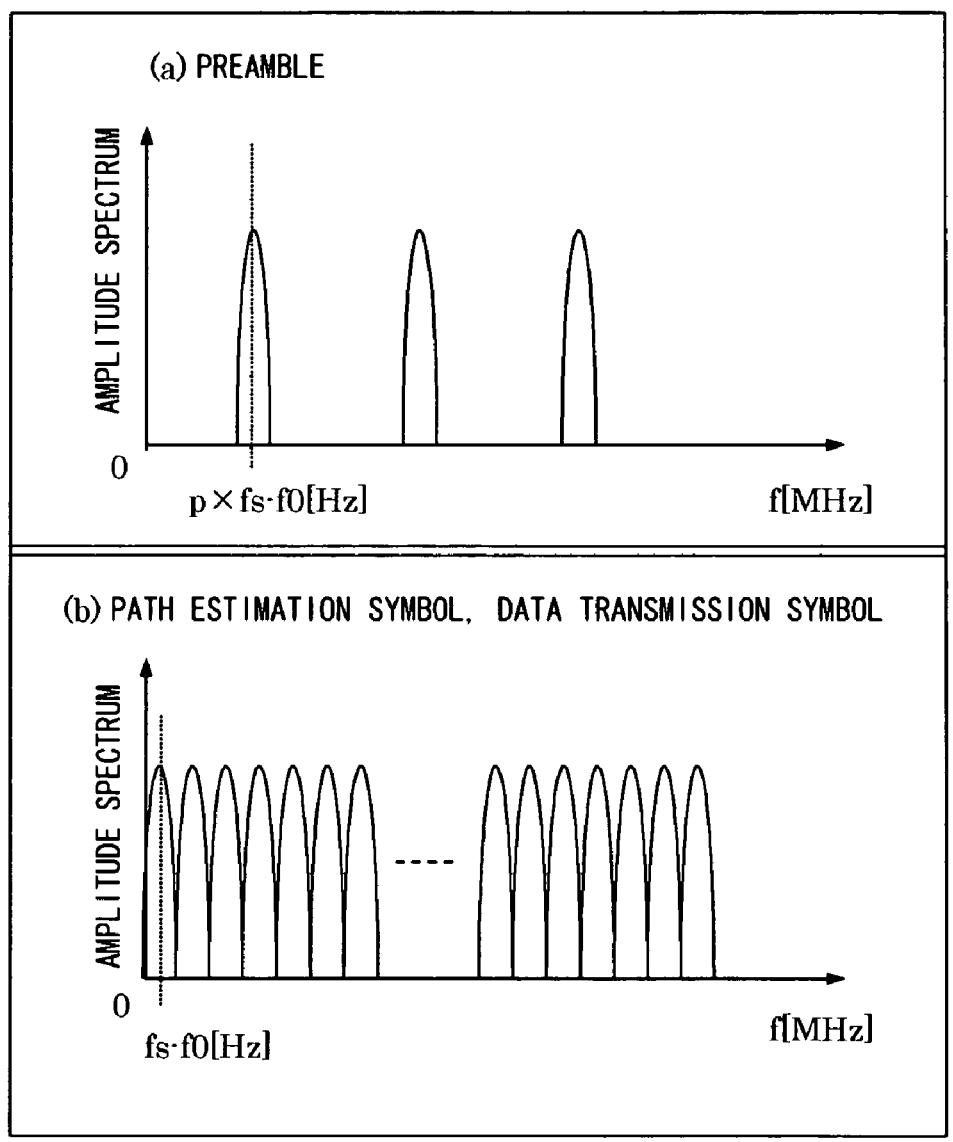
FIG. 8 is an explanatory view showing the amplitude spectrum at a time of generating a frequency offset.

The amplitude spectrum after passing through the LPF 524A or the LPF 524B is represented by the spectrum shown in FIG. 8 and the baseband I/Q signals (x3, y3) after passing through the LPF 524A and the LPF 524B turn to be the amplitude spectrum with the frequency shifted by the frequency offset f0 regardless of the kind of the symbol.

Though the above OFDM transmitter up-conversion unit 51 has been described in the case of the I/Q modulation and the frequency conversion by the directly-frequency conversion method and the above OFDM receiver down-conversion unit 52 has been described in the case of the frequency conversion and the I/Q demodulation by the directly-frequency conversion method, the frequency offset f0 occurs similarly even in the other conversion method.

The baseband I/Q signals supplied from the OFDM receiver down-conversion unit 52 are entered into the OFDM receiver DC offset generator 53 having a function of attaching the DC offset to the signals in FIG. 5. The OFDM receiver DC offset generator 53 is formed by adders 531A and 531B. The DC offset dci to be generated as for the I signal is added to the input baseband I signal x3 by the adder 531A and similarly the DC offset dcq is added to the input baseband Q signal y3 by the adder 531B.

Generally, in the A/D converter for converting the analog baseband signal into the digital signal, the DC offsets independently occur in the I signal and the Q signal. According to FIG. 3, the I and Q signals converted into the baseband signal by the I/Q demodulator 323 are analog signals, and of these signals, the I signal is supplied to the A/D converter 33A and the Q signal is supplied to the A/D converter 33B, hence to obtain the time discrete and amplitude discrete digital signal. The receiver DC offset generator 53 of FIG. 5 is to show that the DC offsets occur in these A/D converters and the signals turn to be the baseband signal (x4, y4) with the DC offsets respectively added to the I signal and the Q signal independently as shown in the following expression 4.

$$x_4(t)=x(t)\cos(2\pi f_0 t+\theta)+y(t)\sin(2\pi f_0 t+\theta)+dci$$

$$y_4(t)=-x(t)\sin(2\pi f_0 t+\theta)+y(t)\cos(2\pi f_0 t+\theta)+dcq \quad \text{[expression 4]}$$

Figure 9:
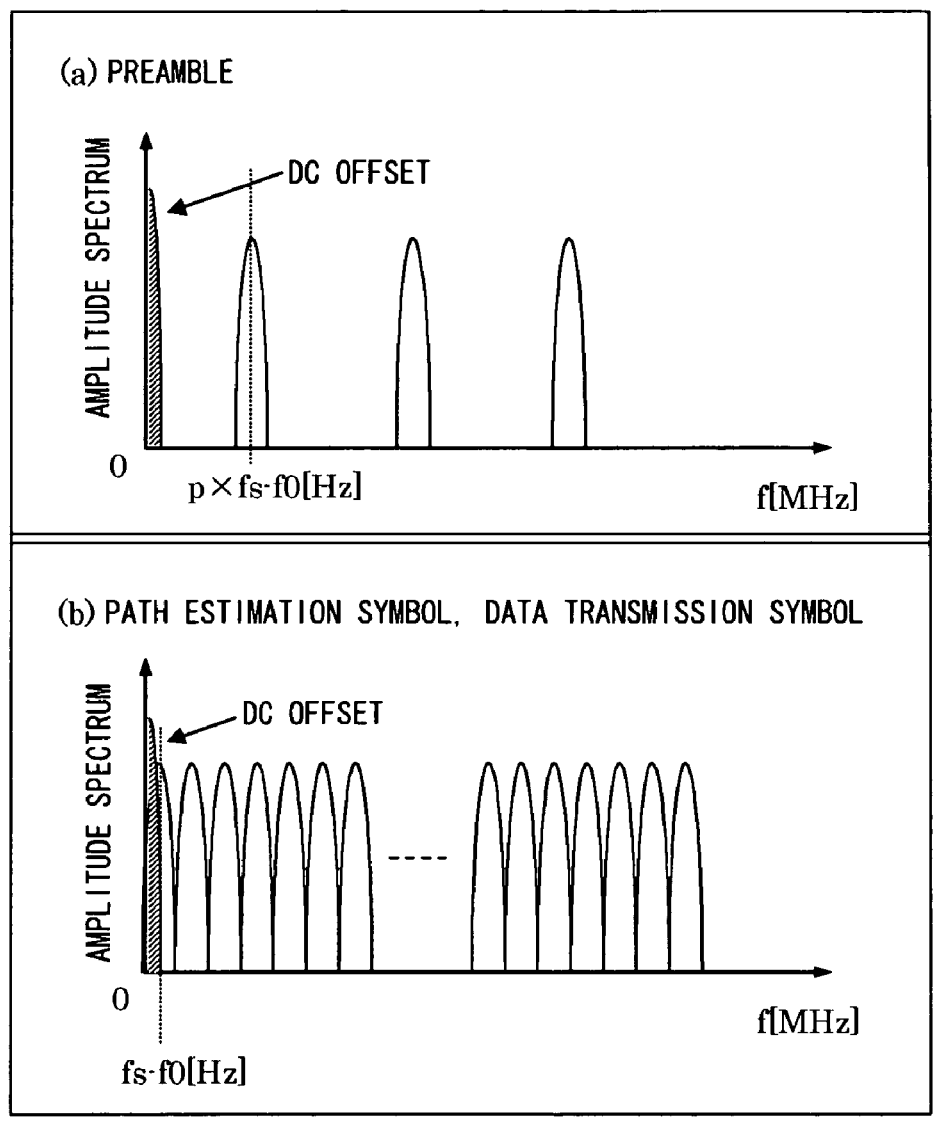
FIG. 9 is an explanatory view showing the amplitude spectrum at a time of generating a DC offset.

As for the amplitude spectrum of the I signal or the Q signal supplied from the receiver DC offset generator 53, when the DC component is defined as A, the Fourier transformed one turns to be $A\delta(f)$ (where, $\delta(f)$ is the Dirac delta function), and the DC component exists in the portion of the zero frequency of the amplitude spectrum, as shown in FIG. 9. Therefore, when there occurs the frequency offset and exists the DC offset, in the path estimation symbol or the data transmission symbol, as shown in (b) of FIG. 9, the DC component overlaps the subcarrier.

On the other hand, in the preamble shown in (a) of FIG. 9, since there is a space of (pxfs-f0) [Hz] between the DC offset and its adjacent carrier, the DC offset does not overlap the subcarrier of the preamble when the frequency offset f0 is smaller than pxfs[Hz]. In the case of the IEEE802.11a standard, for example, the interval pxfs of the subcarriers in the preamble is 1250[kHz] and the frequency offset f0 is 200[kHz] and so.

Figure 1:
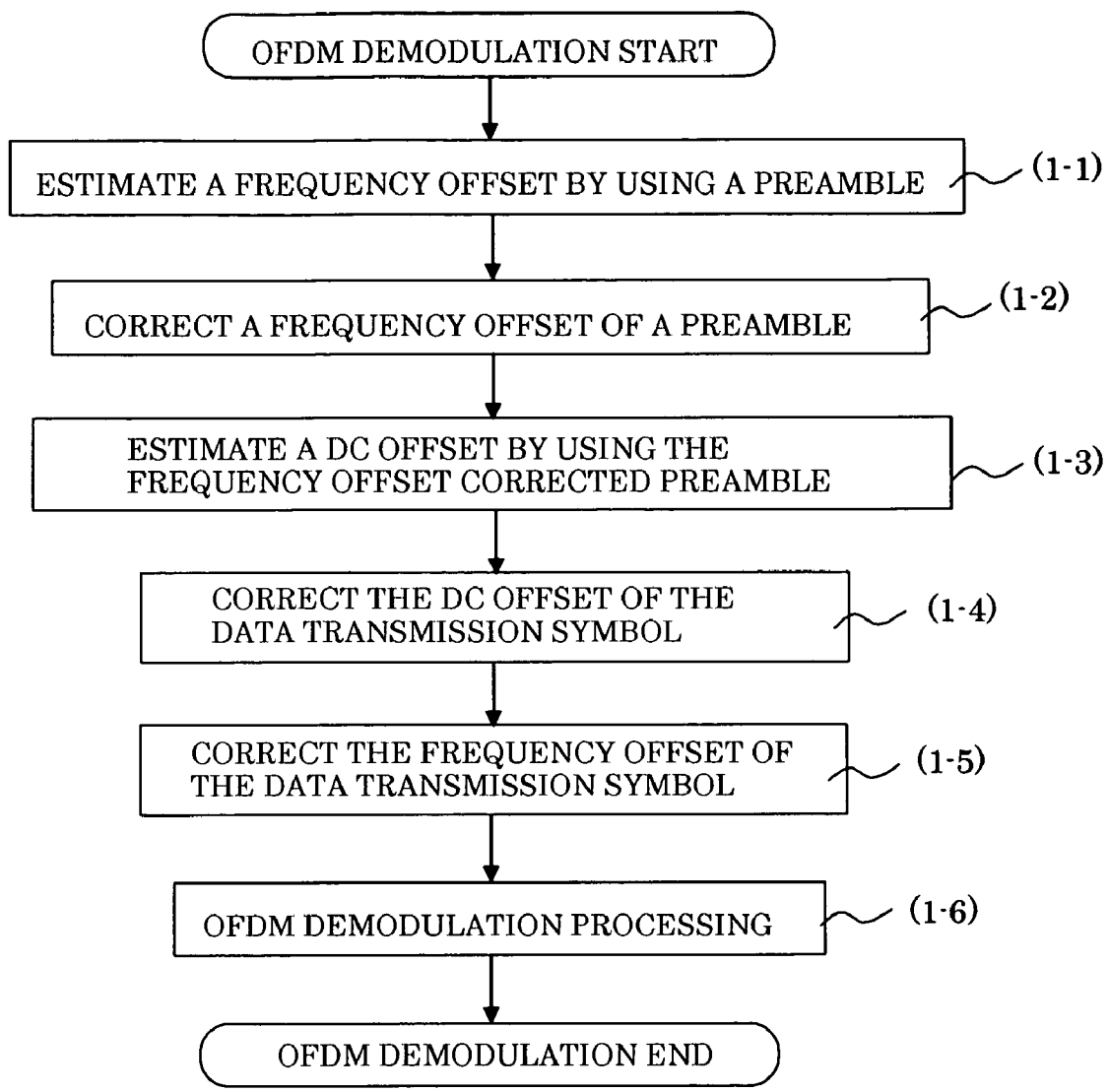
FIG. 1 is a flow chart showing a first example of the procedure of the OFDM demodulation method according to the invention.

The OFDM demodulation is performed on the baseband signal (x4, y4) including the above mentioned frequency offset and DC offset, according to the procedure of (1-1) to (1-6) in FIG. 1.

FIG. 1 shows a flow chart of the OFDM demodulation method according to the invention. The OFDM demodulation method shown in the above figure is targeted at an OFDM packet formed by at least a preamble and the following data transmission OFDM symbol to be transmitted sequentially, in which the subcarrier interval of the preamble is set wider than the subcarrier interval of the data transmission OFDM symbol. When starting the reception of the OFDM packet and detecting the OFDM signal, the following processing (1-1) is executed.

In the processing (1-1), the frequency offset is estimated by using the preamble. Continuously, the processing (1-2) is executed.

In the processing (1-2), the frequency offset of the preamble is corrected based on the frequency offset estimated in the processing (1-1). Continuously, the processing (1-3) is executed.

In the processing (1-3), the DC offset is estimated by using the preamble with the frequency offset corrected in the processing (1-2). An LPF having a narrower passband than that of the subcarrier interval of the preamble is used to estimate the DC offset. After completing the estimation of the DC offset, the processing (1-4) is executed.

In the processing (1-4), the DC offset of the data transmission symbol is corrected based on the DC offset estimated in the processing (1-3). The DC offset is corrected by subtracting the DC offset estimated value from the sample value of the input data transmission symbol individually in the I signal and the Q signal. After completing the correction of the DC offset, the processing (1-5) is executed.

In the processing (1-5), the frequency offset is corrected as for the data transmission symbol in which the DC offset has been corrected in the above processing (1-4), according to the frequency offset estimated value obtained in the above processing (1-1). After completing the frequency offset correction, the processing (1-6) is executed.

In the processing (1-6), the demodulation processing of the OFDM is performed on the data transmission symbol in which the frequency offset has been corrected in the above processing (1-5), the data transmitted from the transmitter is restored and the demodulation processing of the OFDM is finished.

The details of the respective processing mentioned above will be described hereinafter. At first, the frequency offset f0 shown in the processing (1-1) within the flow chart shown in FIG. 1 is estimated in the general method using a fixed pattern of the preamble. A concrete example of the method of estimating the frequency offset will be described later.

Figure 6:
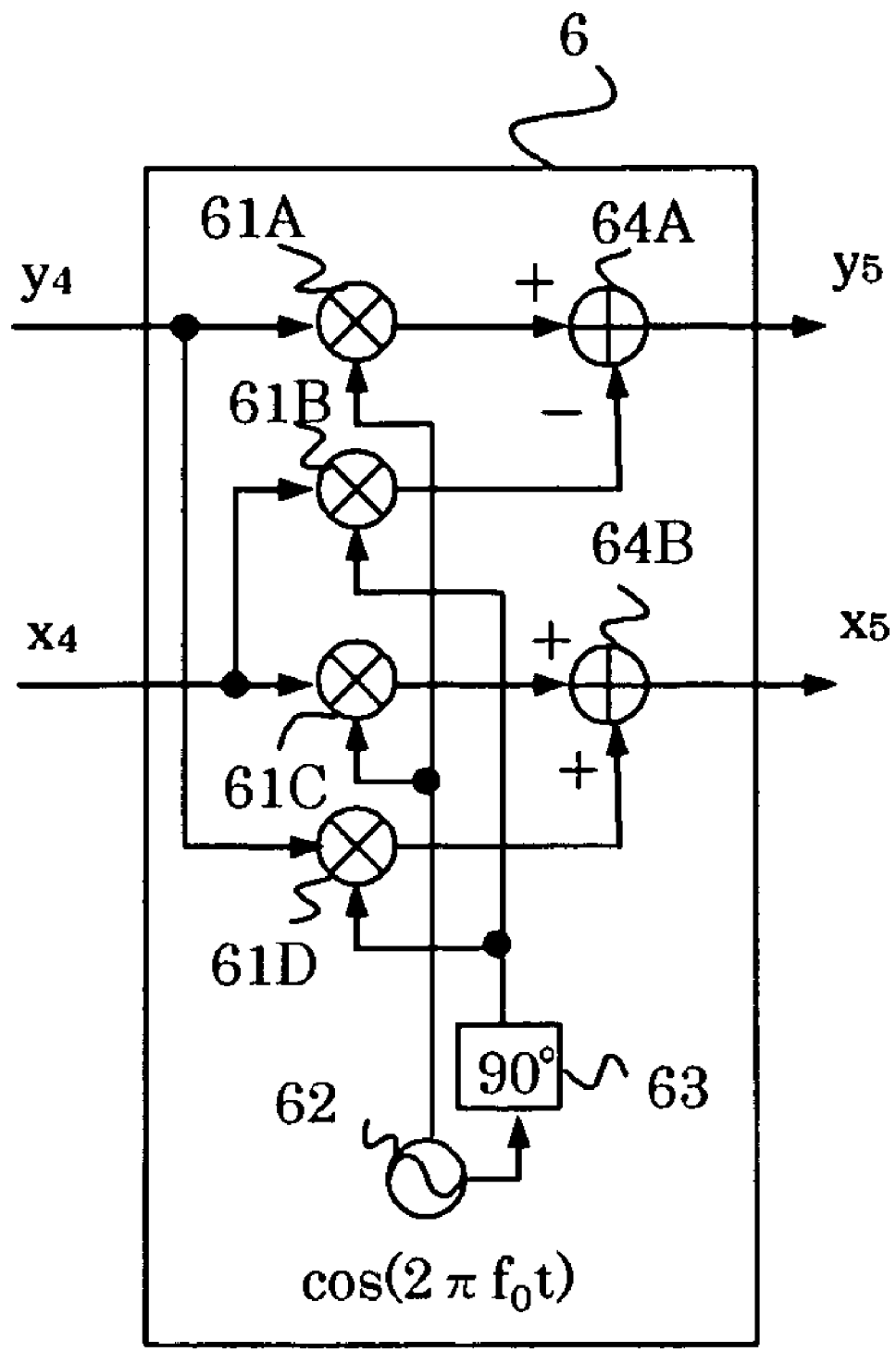
FIG. 6 is a block diagram for use in describing frequency offset correction.

The correction method of the frequency offset shown in the processing (1-2) is described by using the frequency offset correcting unit 6 shown in FIG. 6. The frequency offset correcting unit 6 has a function of correcting the frequency offset f0 and it is formed by a multiplier 61A, a multiplier 61B, a multiplier 61C, a multiplier 6D, an oscillator 62, a 90° phase converter 63, an adder 64A, and an adder 64B. The baseband I signal x4 input from the receiver DC offset generator 53 is multiplied by the output of the oscillator 62 in the multiplier 61C and it is connected to one input side of the adder 64B, while the baseband Q signal y4 is multiplied in the multiplier 61D by the output of the 90° phase converter 63 having a function of shifting the phase of the output signal of the oscillator 62 by 90° and supplying it and it is connected to the other input side of the adder 64B. The adder 64B adds the output of the multiplier 61C to the output of the multiplier 61D, hence to obtain the baseband I signal x5 having the frequency offset corrected.

The baseband I signal input from the receiver DC offset generator 53 is multiplied by the output of the 90° phase converter 63 and connected to one input side of the adder 64A, while the baseband Q signal is multiplied by the output of the oscillator 62 in the multiplier 61A and connected to the other input side of the adder 64A. The adder 64A adds the positive signal of the output of the multiplier 61A to the negative signal of the output of the multiplier 61B, hence to obtain the baseband Q signal having the frequency offset corrected. The frequency of the oscillator 62 is the same as that of the frequency offset f0 estimated in the processing (1-1).

Figure 10:
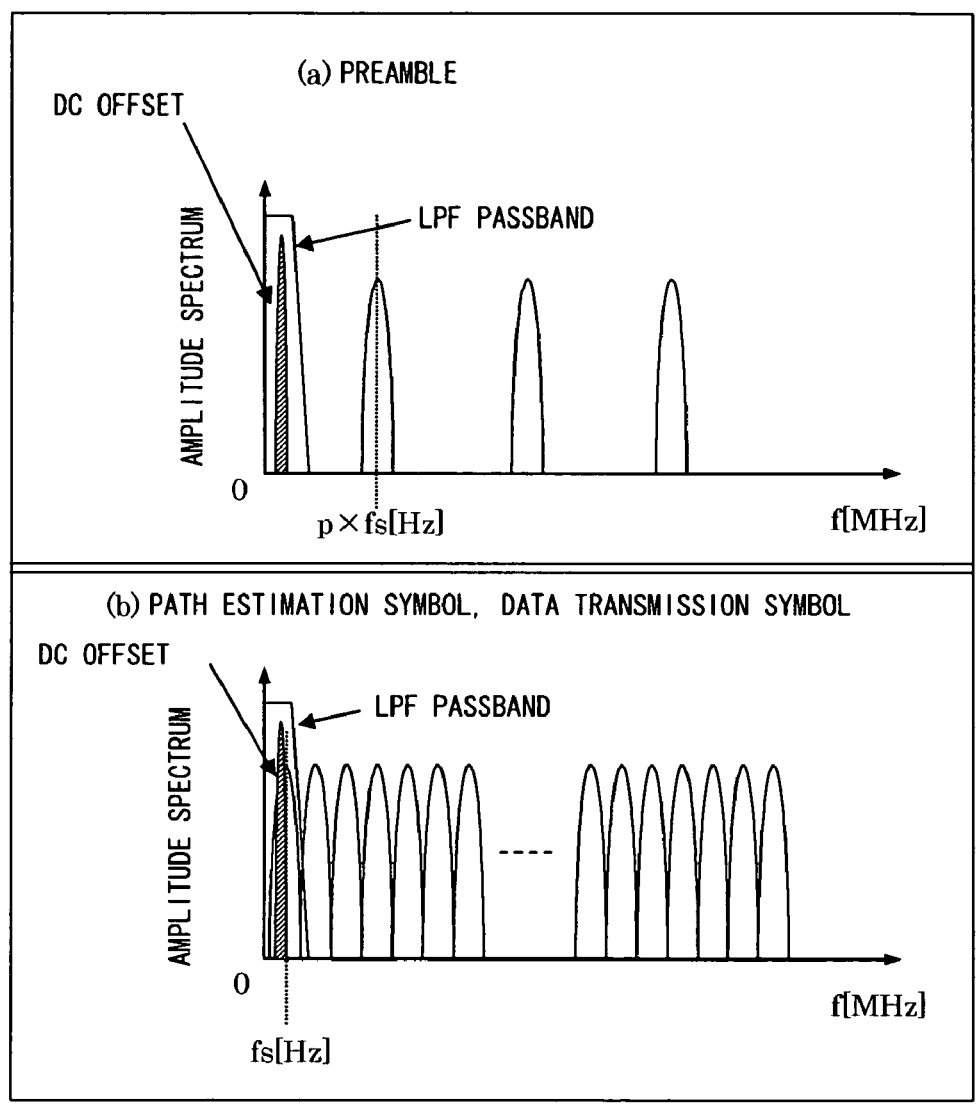
FIG. 10 is an explanatory view showing the amplitude spectrum after correction of the frequency offset.

The amplitude spectrum in which the frequency offset has been corrected by the receiver frequency offset correcting unit 6 shown in FIG. 6 is shown in FIG. 10. The baseband signal (x5, y5) resulting from the correction of the frequency offset can be represented by the following expression 5.

$$\begin{aligned}
x_5(t) &= x_4(t)\cos 2\pi f_0 t - y_4(t)\sin 2\pi f_0 t \quad \text{[expression 5]}\\
&= \{x(t)\cos(2\pi f_0 t + \theta) + y(t)\sin(2\pi f_0 t + \theta) +\\
&\quad dci\}\cos 2\pi f_0 t - \{-x(t)\sin(2\pi f_0 t + \theta) +\\
&\quad y(t)\cos(2\pi f_0 t + \theta) + dcq\}\sin 2\pi f_0 t\\
&= x(t)\cos\theta + y(t)\sin\theta +\\
&\quad dci\cdot\cos 2\pi f_0 t - dcq\cdot\sin 2\pi f_0 t
\end{aligned}$$

$$\begin{aligned}
y_5(t) &= x_4(t)\sin 2\pi f_0 t + y_4(t)\cos 2\pi f_0 t\\
&= \{x(t)\cos(2\pi f_0 t + \theta) + y(t)\sin(2\pi f_0 t + \theta) +\\
&\quad dci\}\sin 2\pi f_0 t + \{-x(t)\sin(2\pi f_0 t + \theta) +\\
&\quad y(t)\cos(2\pi f_0 t + \theta) + dcq\}\cos 2\pi f_0 t\\
&= -x(t)\sin\theta + y(t)\cos\theta +\\
&\quad dci\cdot\sin 2\pi f_0 t + dcq\cdot\cos 2\pi f_0 t
\end{aligned}$$

That the DC offset estimation is possible by using the preamble in the DC offset estimation processing shown in the processing (1-3) will be described by using the amplitude spectrum shown in FIG. 10 and the expression 5.

The position of the subcarrier in the amplitude spectrum having the frequency offset corrected as shown in FIG. 10 is the same as that of the subcarrier of each symbol in the spectrum of the baseband signal at the transmission time shown in FIG. 7. As for the DC offset component, however, the spectrum is shifted according to the correction of the frequency offset. In order to estimate the DC offset by the LPF, in the case of the preamble, considering that the frequency of the DC offset and the frequency of the subcarriers are spaced by pxfs[Hz] and so, it is possible to estimate the DC offset by using the LPF having the passband narrower than the above space. The detailed method will be described by using the expression 5.

The expression 5 indicates the frequency offset corrected baseband signal. Since the frequency of the DC offset component is shifted as shown in the expression 5, the periodicity 1/f0 caused by the frequency shift of the DC offset component does not always conform with the periodicity of the baseband signal. Therefore, when estimating the DC offset by simple average, the above difference of the periodicity disturbs the determination of the period for simple average and causes the failure in estimating the DC offset.

Figure 15:
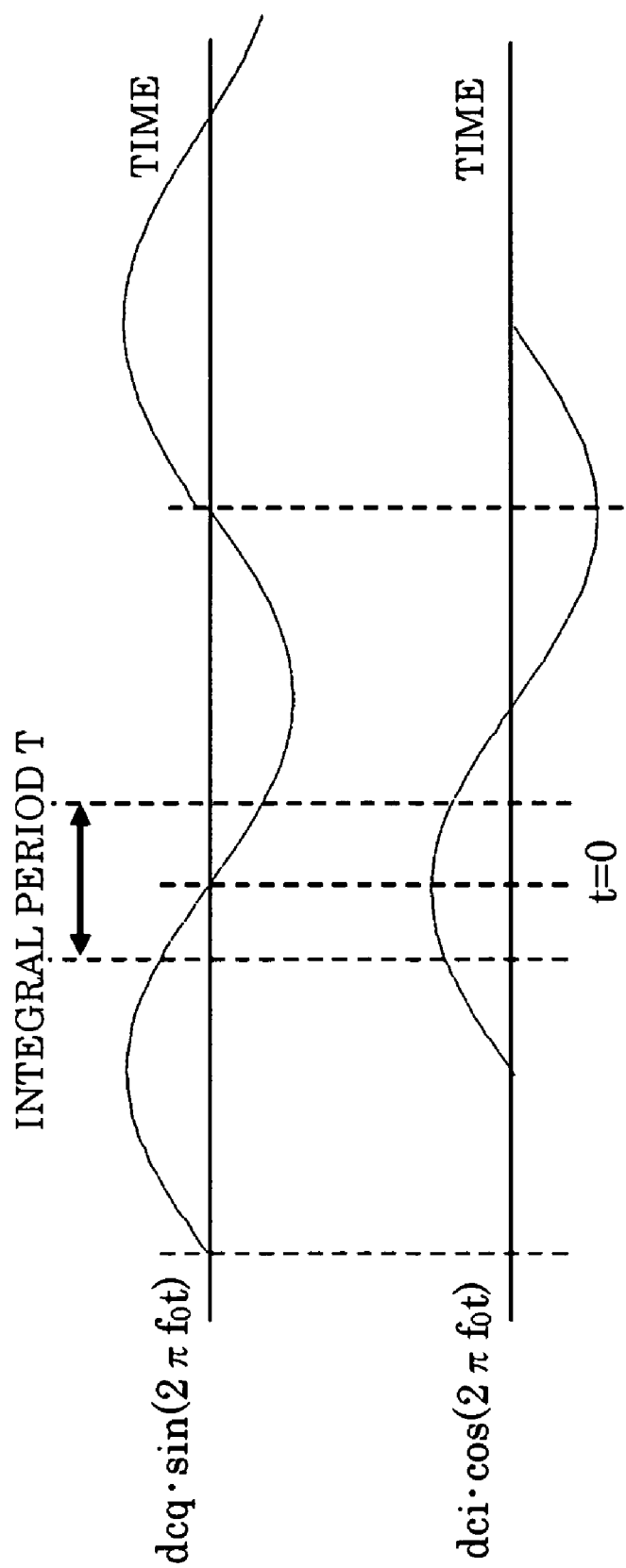
FIG. 15 is an explanatory view of the time average period for estimation of a DC offset.

When arbitrary time having the maximum output of the oscillator 62 of FIG. 6 is regarded as zero, the period T is defined as a predetermined time, as illustrated in FIG. 15. When the baseband signal (x5, y5) in the period of −T/2 to T/2 around the time t=0 is defined as an input signal of the LPF, the time average turns to be zero because sin 2πf0t is an odd function. Using this quality, since the DC offsets dci and dcq are constant in time, the time average becomes zero as for the term of dcq·sin 2πf0t and the term of dci·sin 2πf0t in the expression 5. Since all the subcarriers of the preamble are not included in this passband of the LPF when the passband of the LPF is narrower than pxfs[Hz], of the remaining terms in the expression 5, and since the initial phase θ is a fixed value, the terms related to the baseband signals x(t) and y(t) are removed from the LPF. Finally, only the DC offset component remains in the baseband signal after passing through the LPF, and accordingly, the DC offset can be estimated according to the time average of the baseband signals after the LPF, in short, according to the time average as for the term of dcq·cos 2πf0t and the term of dci·cos 2πf0t in the expression 5.

According to the above DC offset estimation method, it is possible to estimate the DC offset even when there is no frequency offset, namely f0=0, by substituting f0=0 in the expression 5 and the expression 6, without adding any change.

As mentioned above, it is possible to estimate the DC offset with the LPF by making use of the quality of the subcarrier arrangement of the preamble, regardless of the presence of the frequency offset.

Figure 14:
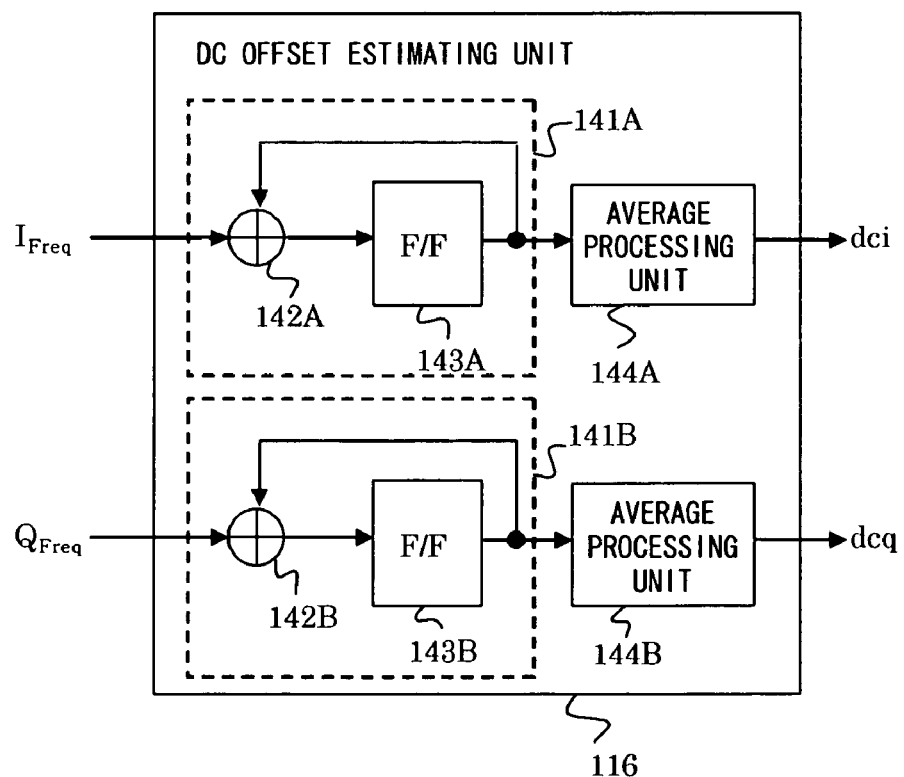
FIG. 14 is a block diagram showing one example of the details of the DC offset estimating unit.

FIG. 14 shows one example of the DC offset estimating unit 116. The structure of the DC offset estimating unit 116 will be described. In the expression 5 described in the DC offset estimation processing (1-3) of FIG. 1, when considering that the LPF is formed by integrating the signals in the central part of the time t=0, the following approximate expression 6 can be obtained.

$$\begin{aligned}
\int_{-T/2}^{T/2} x_5(t)\,dt &= \cos\theta\cdot\int_{-T/2}^{T/2} x(t)\,dt + \sin\theta\cdot \quad \text{[expression 6]}\\
&\quad \int_{-T/2}^{T/2} y(t)\,dt +\\
&\quad dci\cdot\int_{-T/2}^{T/2}\cos 2\pi f_0 t\,dt + dcq\cdot\\
&\quad \int_{-T/2}^{T/2}\sin 2\pi f_0 t\,dt\\
&\cong \cos\theta\cdot\int_{-T/2}^{T/2} x(t)\,dt + \sin\theta\cdot\\
&\quad \int_{-T/2}^{T/2} y(t)\,dt + dci\cdot T\\
&= dci\cdot T \int_{-T/2}^{T/2} y_5(t)\,dt\\
&= \sin\theta\cdot\int_{-T/2}^{T/2} x(t)\,dt + \cos\theta\cdot\\
&\quad \int_{-T/2}^{T/2} y(t)\,dt -\\
&\quad dci\cdot\int_{-T/2}^{T/2}\sin 2\pi f_0 t\,dt +\\
&\quad dcq\cdot\int_{-T/2}^{T/2}\cos 2\pi f_0 t\,dt\\
&\cong \sin\theta\cdot\int_{-T/2}^{T/2} x(t)\,dt + \cos\theta\cdot\\
&\quad \int_{-T/2}^{T/2} y(t)\,dt + dcq\cdot T\\
&= dcq\cdot T
\end{aligned}$$

In the expression 6, by integrating (x5, y5), the sin component is negated and there remains only the cos component (the dci and dcq are time constant within packet). The preamble is formed by a fixed pattern having the minimum cycle Tp and the time average of the minimum cycle Tp is zero. Therefore, when the integral period T is set as the period of multiplying the minimum cycle Tp of the preamble by natural number, the time average of the preamble in the integral period T is zero and x(t) and y(t) are integrated into zero. Finally, the product of the integral period T and the DC offset value remains and this is divided by the integral period T, hence to estimate the DC offset. Since the passband of the LPF at this time is determined by the integral period T, the DC offset can be estimated correctly by making the passband narrower than the frequency interval of the subcarriers in the preamble.

FIG. 14 is a block diagram of the DC offset estimating unit 116 for realizing the method of estimating the DC offset by the integral filter having been described in the expression 6. When receiving the frequency offset corrected preamble I signal, an accumulation adder 141A formed by an adder 142A and a flip flop 143A starts accumulation and addition of the I signal. Before starting the accumulation and addition, it is assumed that the flip flop 143A is initialized. After staring the accumulation and addition of the preamble, when the integral multiple period of the preamble period has elapsed, the data is entered into the averaging unit 144A, hence to obtain the averaged DC offset. The same procedure will be performed as for the frequency offset corrected preamble Q signal.

The DC offset correction shown in the processing (1-4) is performed by simply subtracting the DC offset estimated in the processing (1-3) from the input OFDM signal. For the frequency correction processing shown in the processing (1-5) of FIG. 1, the frequency offset correction will be performed according to the method described in the receiver frequency offset correcting unit 6 of FIG. 6.

Figure 13:
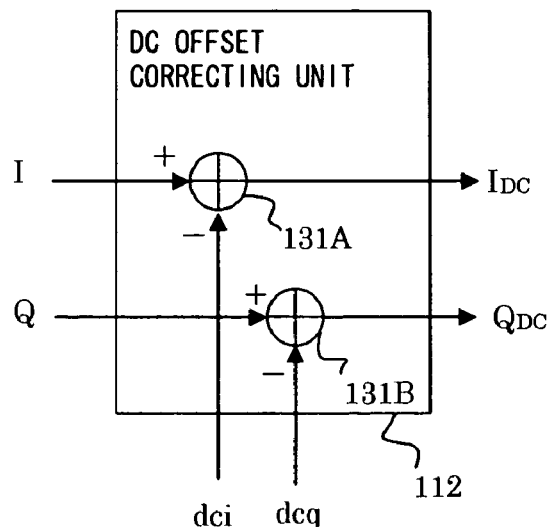
FIG. 13 is a block diagram showing one example of the details of the DC offset correcting unit.

FIG. 13 shows the block structure of the DC offset correcting unit 112. By subtracting the DC offset I signal (dci) from the input baseband I signal in a subtracter 131A, the DC offset corrected baseband I signal $I_{DC}$ can be obtained. Similarly, the DC offset corrected baseband Q signal $Q_{DC}$ can be obtained by using the DC offset Q signal (dcq) as for the Q signal. The DC offset correcting unit 112 is controlled by a timing controller 117 described later so as to enter the DC offset that is dci=0 and dcq=0 when estimating the frequency offset. Because the frequency offset is estimated before estimation of the DC offset.

At the end, the OFDM demodulation shown in the processing (1-6) of FIG. 1 will be performed according to the general OFDM demodulation method described in the IEEE802.11a standard. In the procedure shown in FIG. 1, although the DC offset correction, the frequency offset correction, and the OFDM demodulation are sequentially performed on the whole data transmission symbols, the above processing may be performed on every symbol.

As mentioned above, according to the first embodiment of the invention, it is possible to estimate the DC offset by using the preamble, correct the DC offset based on its value, and perform the OFDM demodulation.

Figure 2:
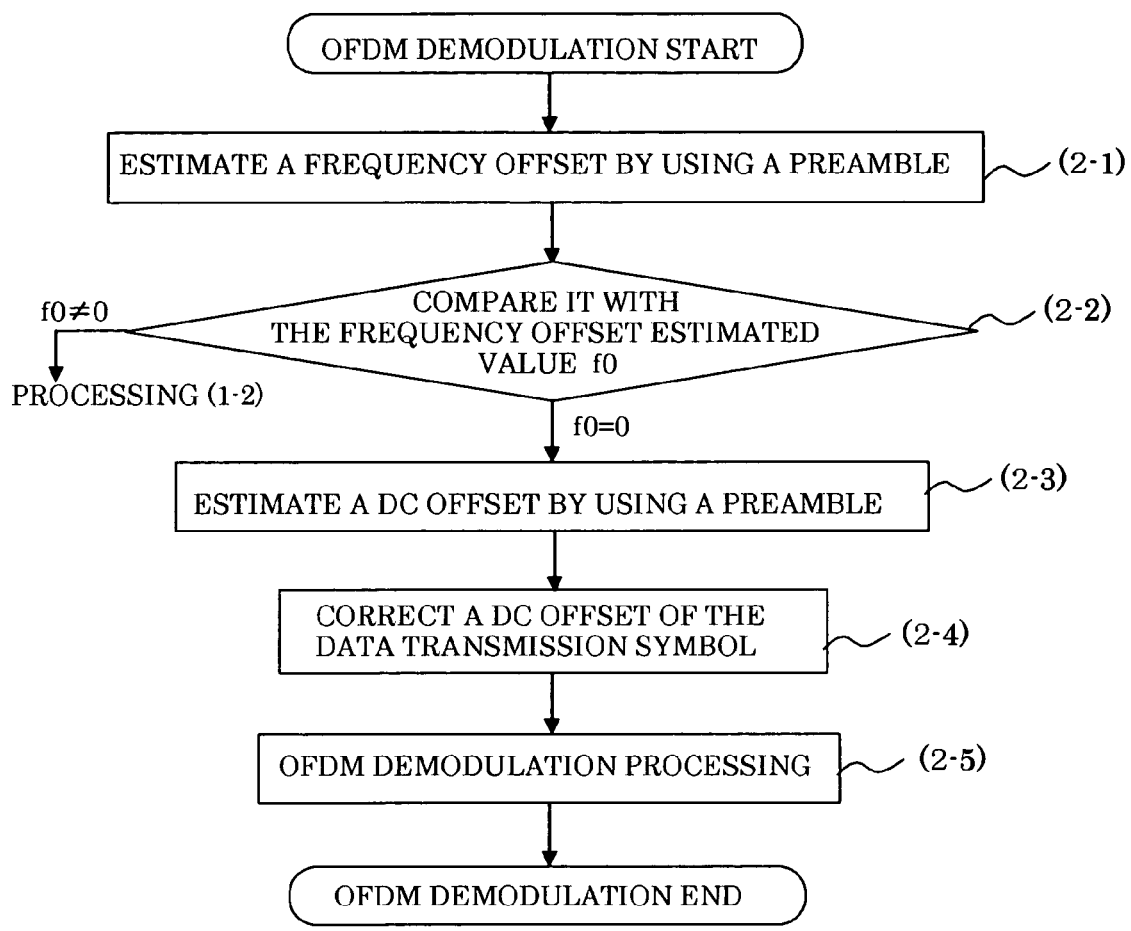
FIG. 2 is a flow chart showing a second example of the procedure of the OFDM demodulation method according to the invention.

FIG. 2 shows a flow chart of a second embodiment of the OFDM demodulation method according to the invention. Similarly to the example of FIG. 1, the OFDM demodulation method shown in the above figure is targeted at an OFDM packet formed by at least a preamble and the following data transmission OFDM symbol to be transmitted sequentially, in which the subcarrier interval of the preamble is set wider than the interval of the subcarriers of the data transmission OFDM symbol. When staring the reception of the OFDM packet and detecting the OFDM signal, the processing (2-1) to (2-5) shown as follows will be performed.

In the processing (2-1), the frequency offset is estimated by using the preamble and continuously the processing (2-2) is performed.

In the processing (2-2), when the frequency offset estimated in the processing (2-1) is zero, the processing (2-3) is performed. When the frequency offset estimated value is other than zero, the processing (1-2) shown in FIG. 1 is performed and since then, according to the procedure shown in FIG. 1, the DC offset is estimated and corrected.

In the processing (2-3), the DC offset is estimated by using the preamble. A simple time average method or an LPF having the passband narrower than the subcarrier interval of the preamble is used in order to estimate the DC offset. After completing the estimation of the DC offset, the processing (2-4) is performed.

In the processing (2-4), the DC offset of the data transmission symbol is corrected based on the DC offset estimated in the processing (2-3). Correction of the DC offset is performed by subtracting the DC offset estimated value from the sample value of the input data transmission symbol independently in the I signal and the Q signal. After completing the correction of the DC offset, the processing (2-5) is performed.

In the processing (2-5), the OFDM demodulation is performed on the data transmission symbol in which the DC offset has been corrected in the processing (2-4), and the data transmitted from the transmitter is demodulated, thereby completing the OFDM demodulation.

Each processing of FIG. 2 will be described in detail. At first, the estimation of the frequency offset f0 shown in the processing (2-1) in the flow chart of FIG. 2 is the same as the processing (1-1) shown in FIG. 1.

In the processing (2-2), an operation for branching the processing according to the frequency offset value estimated in the processing (2-1) is performed. When the estimated frequency offset is zero, the processing (2-3) is performed. When the estimated frequency offset f0 is other than zero, the processing (1-2) shown in FIG. 1 is performed, and continuously the DC offset estimation, the DC offset correction, and the OFDM demodulation shown in the processing (1-3) to (1-6) of FIG. 1 are performed.

In the processing (2-3), since f0=0 because there is no frequency offset, the baseband signal (x4, y4) after generation of the DC offset at this time can be transformed as (x4', y4') as shown in the expression 7.

$$x'_4(t)=x(t)\cos\theta+y(t)\sin\theta+dci$$

$$y'_4(t)=-x(t)\sin\theta+y(t)\cos\theta+dcq \qquad \text{[expression 7]}$$

In the expression 7, since the time average of the I signal x(t) and the Q signal y(t) in the preamble becomes zero and the initial phase θ is a fixed value, the time average of x(t)cos θ, y(t)sin θ, x(t)sin θ, and y(t)cos θ becomes zero. Accordingly, the DC offsets dci and dcq can be estimated according to the time average of the preamble period.

Although the DC offset estimation method according to the time average has been described in the above, in another method of estimating the DC offset by using the LPF, all the subcarriers of the preamble are not included in the passband of this LPF when the passband of the LPF is narrower than pxfs [Hz] because f0=0 in (pxfs-f0) [Hz]. Therefore, since only the DC offset component remains in the baseband signal after passing through the LPF, the DC offset can be estimated by the time average of the baseband signal supplied from the LPF.

It is assumed that the correction of the DC offset shown in the processing (2-4) is the same as the processing (1-4) shown in FIG. 1.

At last, it is assumed that the OFDM demodulation shown in (2-5) is the same as the processing (1-6) shown in FIG. 1.

As mentioned above, according to the method of the second embodiment, it is possible to estimate the DC offset by using the preamble and correct the DC offset based on its value, thereby performing the OFDM demodulation.

((OFDM Demodulator))

Figure 11:
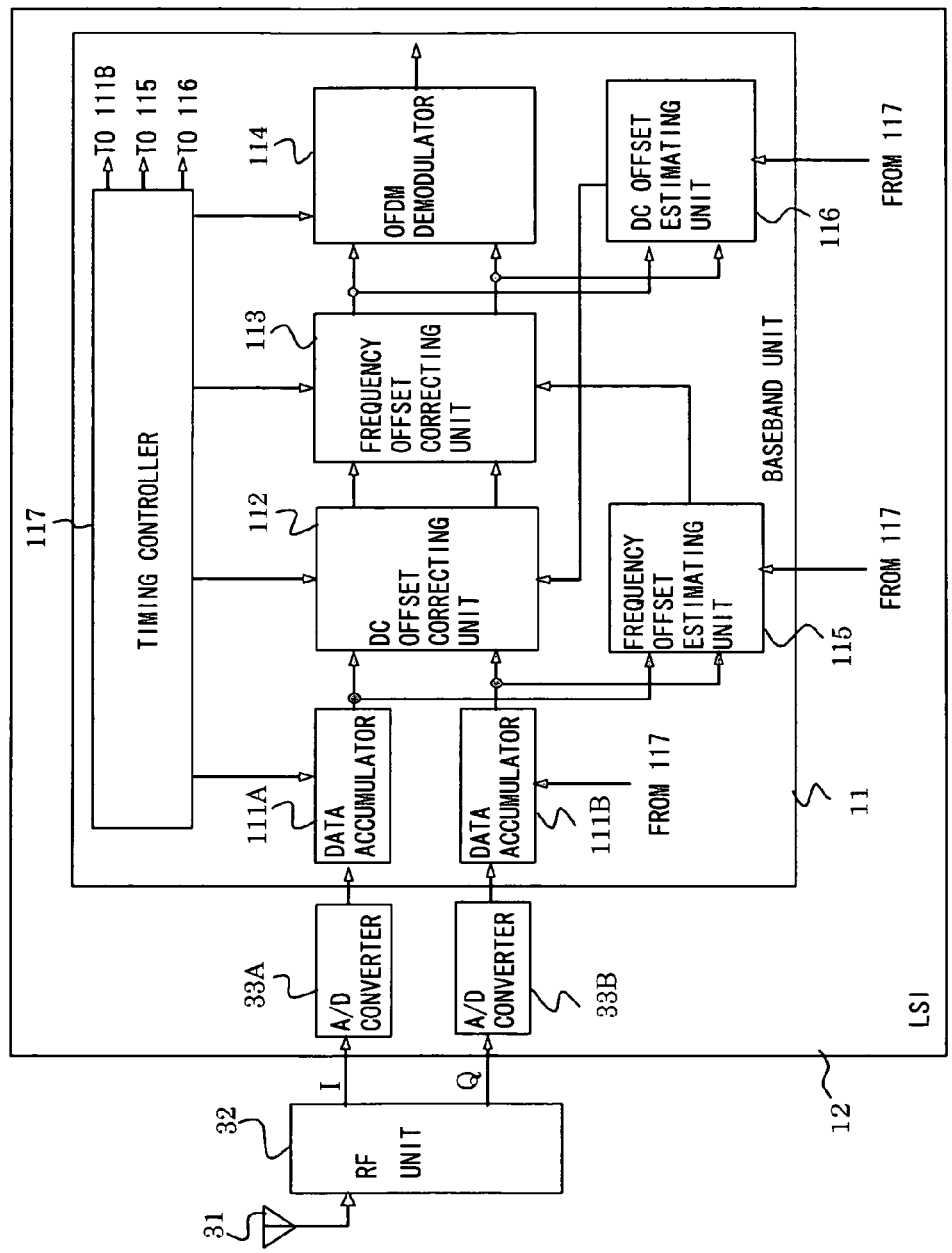
FIG. 11 is a block diagram showing one example of the OFDM demodulator according to the invention.

FIG. 11 shows the OFDM demodulator using the OFDM demodulation method having been described in FIG. 1. The OFDM demodulator shown in the above figure comprises an antenna 31 for receiving radio waves OFDM-modulated in the channel central frequency, an RF unit 32, connected to the antenna 31, for converting the OFDM signal modulated in the channel central frequency into the baseband OFDM signal, A/D converters 33A and 33B for converting the analog baseband signal supplied from the RF unit 32 into digital, and a baseband unit 11 for OFDM-demodulating the baseband signal supplied from the A/D converters 33A and 33B to restore the data. Although it is not restricted to this, the A/D converters 33A and 33B and the baseband unit 11 are realized as an analog/digital mixed integrated circuit (LSI) 12 which is formed on one semiconductor substrate. This semiconductor integrated circuit is not restricted to the above components, but it may include the RF unit 32 or the other circuit module.

The baseband unit 11 comprises data accumulators 111A and 111B for accumulating the digital data supplied from the A/D converters 33A and 33B, a frequency offset estimating unit 115, connected to the data accumulators 111A and 111B, for estimating the frequency offset, a DC offset correcting unit 112 that is the block for correcting the DC offset of the data supplied from the data accumulators 111A and 111B by using the correction value received from a DC offset estimating unit 116, a frequency offset correcting unit 113 that is the block, connected to the DC offset correcting unit 112, for correcting the frequency offset from the input data by using the correction value received from a frequency offset estimating unit 115, the DC offset estimating unit 116 connected to the frequency offset correcting unit 113, for estimating the DC offset, an OFDM demodulator 114 for demodulating the OFDM signal received from the frequency offset correcting unit 113, so to restore the data, and a timing controller 117 for controlling the timing of the baseband unit 11. The A/D converters 33A and 33B are controlled by the timing controller 117. The timing controller 117 may be formed in a hard wired logic or a micro computer core of reserving the central processing unit (CPU) and its operation program.

In the OFDM demodulation method shown in FIG. 1, the frequency offset estimation by using the preamble in the processing (1-1) is performed by the frequency offset estimating unit 115 of FIG. 11. The frequency offset correction by using the preamble in the processing (1-2) is performed by the frequency offset correcting unit 113 of FIG. 11. The DC offset estimation by using the preamble in the processing (1-3) is performed by the DC offset estimating unit 116 of FIG. 11. The DC offset correction of the data transmission OFDM symbol in the processing (1-4) is performed by the DC offset correcting unit 113 of FIG. 11. The frequency offset correction for data transmission in the processing (1-5) is performed by the frequency offset correcting unit 113 of FIG. 11. The OFDM demodulation in the processing (1-6) is performed by the OFDM demodulator 114 of FIG. 11. The timing controller 117 shown in FIG. 11 has a function of controlling the sequence of the processing shown in FIG. 1.

Figure 12:
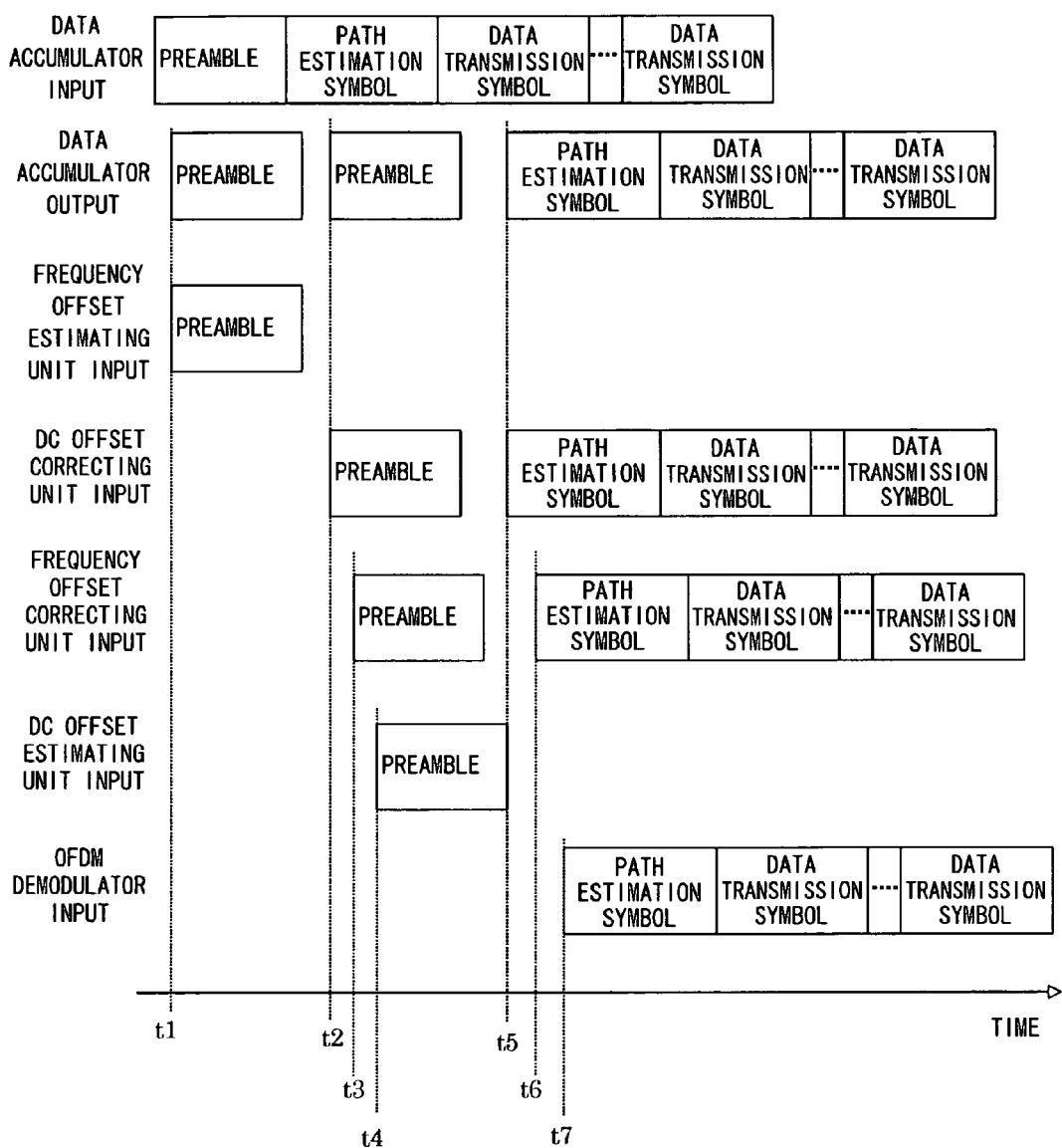
FIG. 12 is a timing chart showing the demodulation operation by the OFDM demodulator of FIG. 11.

FIG. 12 shows a timing chart of the demodulation operation by the OFDM demodulator of FIG. 11.

The received OFDM signal is supplied to the baseband unit 11 via the antenna 31, the RF unit 32, and the A/D converters 33A and 33B, as the baseband signal. The received signals continue to be stored sequentially in the data accumulators 111A and 111B.

The preamble at the head of the packet, of the stored signals, is read out from the data accumulators 111A and 111B at the time t1, and it is supplied to the frequency offset estimating unit 115, hence to estimate the frequency offset f0.

When completing the estimation of the frequency offset, the preamble is again supplied from the data accumulators 111A and 111B at the time t2 to the DC offset correcting unit 112. The DC offset correcting unit 112 passes the input data as it is, without correcting the DC offset, and the preamble is supplied to the frequency offset correcting unit 113 at the time t3. Here, the frequency offset is corrected based on the frequency offset value f0 estimated by the frequency offset estimating unit 115.

The frequency offset corrected preamble is supplied to the DC offset estimating unit 116 at the time t4. The DC offset is estimated based on the input preamble. Here, assume that the DC offset I component is defined as dci and that the DC offset Q component is defined as dcq.

When completing the estimation of the DC offset, the path estimation symbol and the data transmission symbol are supplied from the data accumulators 111A and 111B at the time t5 to the DC offset correcting unit 112. The DC offset is cancelled in the DC offset correcting unit 112, based on the DC offset value estimated by the DC offset estimating unit 116. The DC offset correcting unit 112 has a function of subtracting the DC offset estimated value from the input data independently in the I signal and the Q signal.

The DC offset corrected path estimation symbol and data transmission symbol are supplied to the frequency offset correcting unit 113 at the time t6. Here, they are corrected based on the frequency offset value required in the frequency offset estimating unit 115.

The frequency offset corrected signal is supplied to the OFDM demodulator 114 at the time t7, where the OFDM signal is demodulated, to restore the transmitted data.

The output signal of the data accumulators 111A and 111B is as shown in FIG. 12: the preamble is output at the time t1, the preamble is output at the time t2, and the path estimation symbol and the data transmission symbol are output at the time t5. The input data to the data accumulators 111A and 111B is continuously supplied from the A/D converters 33A and 33B. In order to supply data to and from the data accumulators 111A and 111B simultaneously, a dual port RAM can be used as one constitutional example of the data accumulators 111A and 111B.

((Estimation of the Frequency Offset))

Figure 16:
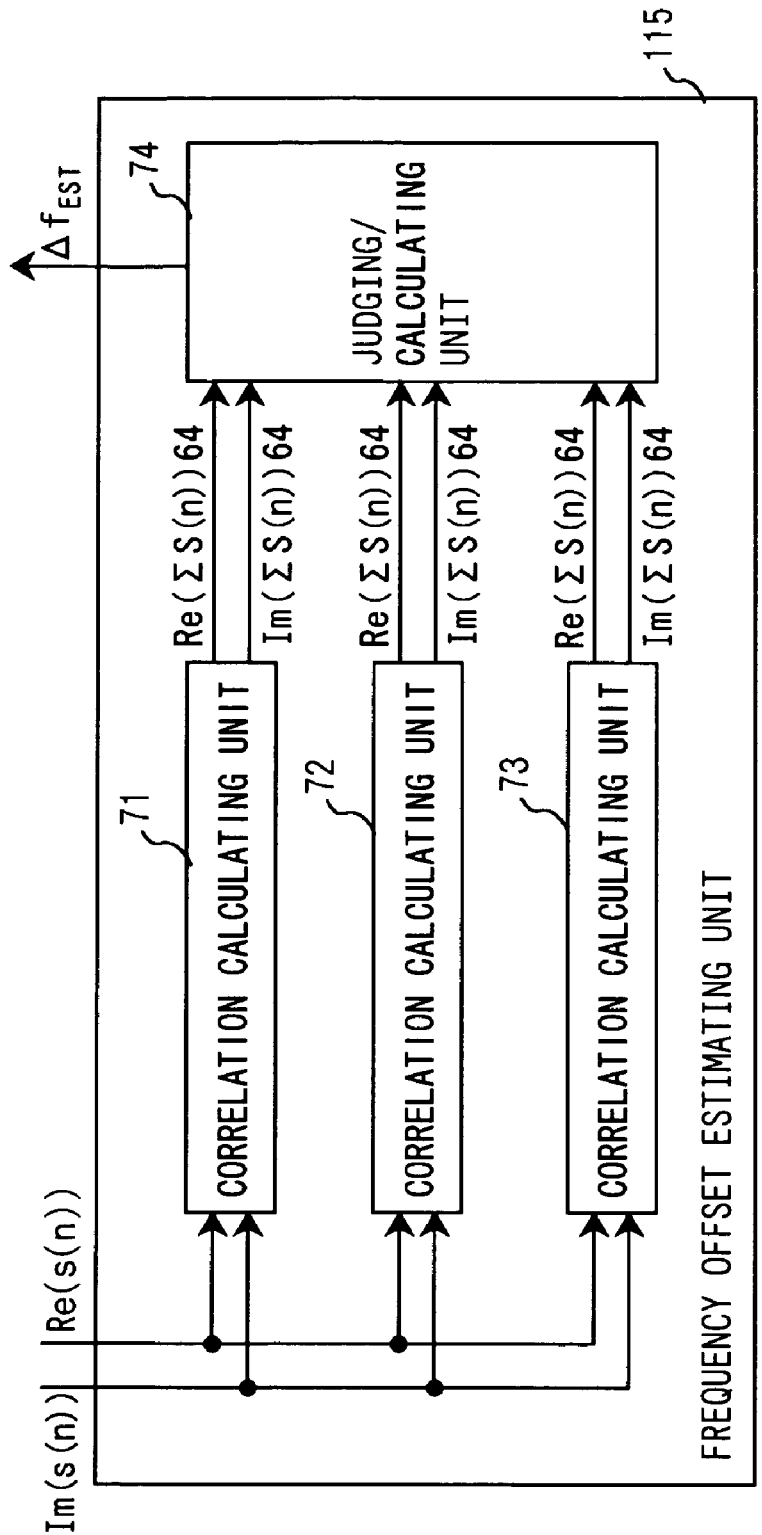
FIG. 16 is a block diagram showing one example of a frequency offset estimating unit.
Figure 17:
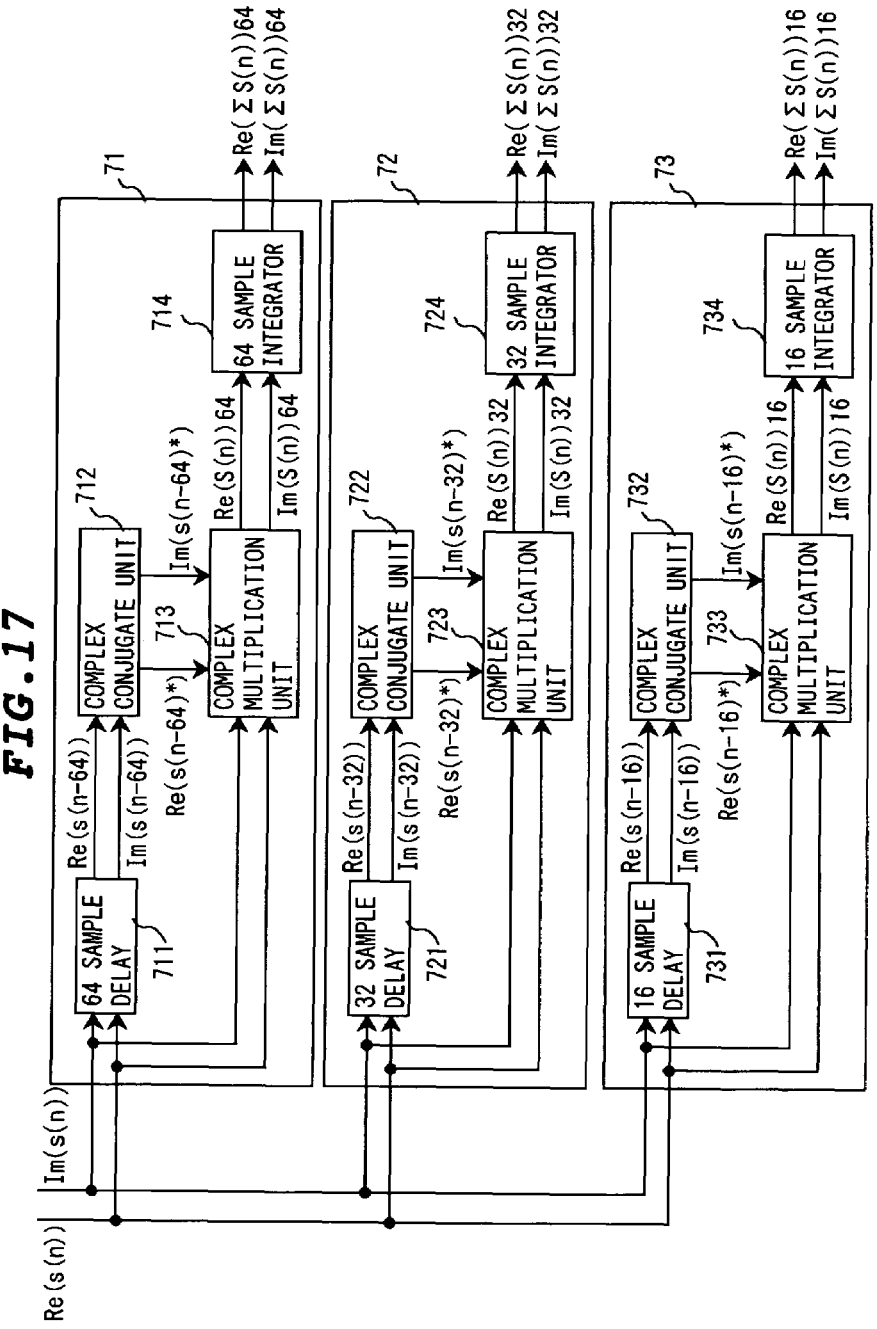
FIG. 17 is a block diagram showing one example of the details of a correlation calculating unit.
Figure 18:
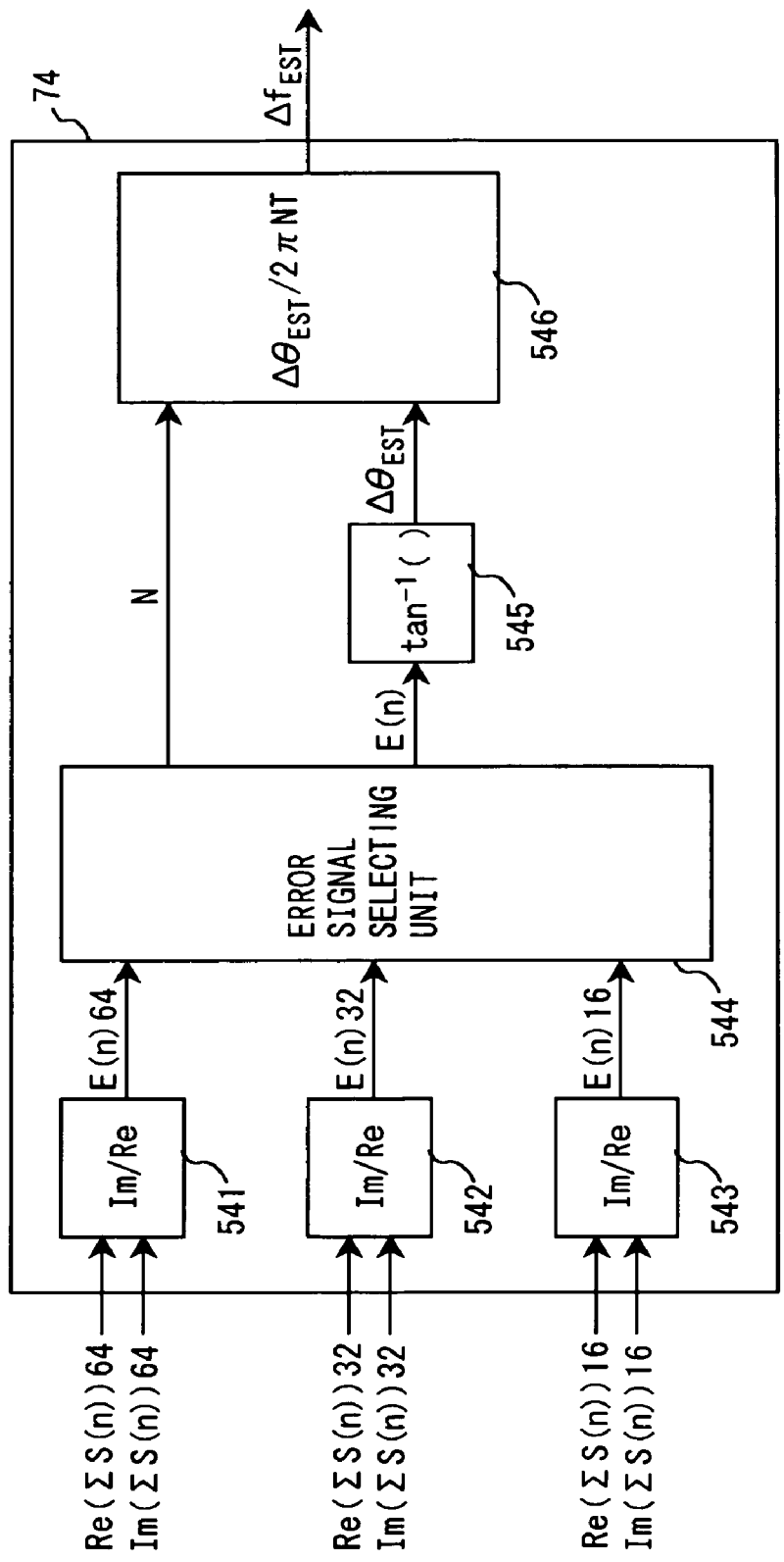
FIG. 18 is a block diagram showing one example of the details of a judging/calculating unit.

The concrete example of the method for estimating the frequency offset will be described here. The constitutional example of the frequency offset estimating unit 115 is shown in FIG. 16. The received signal s(n) is supplied to the frequency offset estimating unit. The s(n) is the received OFDM signal, and Re(s(n)) and Im(s(n)) respectively indicate the real number and the imaginary number of s(n). The frequency offset estimating unit 115 has correlation calculating units 71, 72, and 73 and a judging/calculating unit 74. FIG. 17 shows the details of the correlation calculating units 71, 72, and 73 and FIG. 18 shows the details of the judging/calculating unit 74.

Upon receipt of the received signal s(n), the frequency offset estimating unit includes the correlation calculating units 71, 72, and 73 for requiring correlation between this signal s(n) and the respective signals s(n−64), s(n−32), and s(n−16) received with respective delays of 64 samples, 32samples and 16samples and the judging/calculating unit 74 for receiving the correlation values ΣS(n)64, ΣS(n)32, and ΣS(n)16 supplied from the correlation calculating units 71, 72, and 73, requiring the error signals E(n)64, E(n)32, and E(n)16 as for these correlations, selecting the error signal E(n) for use in the estimation so as to minimize the frequency offset estimation error, from the above E(n)64, E(n)32, and E(n)16, requiring $\Delta\theta_{EST}$ from the above E(n), calculating the frequency offset estimated value $\Delta f_{EST}$ from $\Delta\theta_{EST}$, and supplying the same. The above $\Delta\theta_{EST}$ is a phase deviation between the s(n) estimated from the received preamble and s(n−64). The frequency offset estimated value $\Delta\theta_{EST}$ means the above mentioned frequency offset f0.

In FIG. 1, the correlation calculating units 71, 72, and 73 calculate the correlation values ΣS(n)64, ΣS(n)32, and ΣS(n)16 between the received signal s(n) and the respective delay signals s(n−64), s(n−32), and s(n−16) having the respective delays of 64 samples, 32 samples, and 16 samples. These results are entered into the judging/calculating unit 74 and the judging/calculating unit 74 requires the error signals E(n)64, E(n)32, and E(n)16 corresponding to the three kinds of correlation values of ΣS(n)64, ΣS(n)32, and ΣS(n)16, selects the error signal for use in the final estimation of the frequency offset, from E(n)64, E(n)32, and E(n)16, calculates the phase deviation, $\Delta\theta_{EST}$ from the selected error signal, and supplies the frequency offset estimated value $\Delta f_{EST}$ by using the following expression (a), according to the selected error signal;

$$\Delta f_{EST} = \Delta\theta_{EST}/2\pi TN \quad (a)$$

Where, N is the number of delay samples corresponding to the selected correlation value, and it takes one of 16, 32, and 64 in this embodiment.

As illustrated in FIG. 17, the correlation calculating unit 71 includes a delay unit 711 for delaying the received signal s(n) by 64 samples and supplying s(n−64), a complex conjugate unit 712 for obtaining the complex conjugate s(n−64)* of s(n−64), a complex multiplication unit 713 for obtaining the product S(n)64 through the complex multiplication of s(n) and s(n−64)*, and an integrator 714 for integrating S(n)64 for 64 samples and supplying the correlation value ΣS(n)64.

The correlation calculating unit 72 includes a delay unit 721 for delaying the received signal s(n) by 32 samples and supplying s(n−32), a complex conjugate unit 722 for obtaining the complex conjugate s(n−32)* of s(n−32), a complex multiplication unit 723 for obtaining the product S(n)32 through the complex multiplication of s(n) and s(n−32)*, and an integrator 724 for integrating S(n)32 for 32 samples and supplying the correlation value ΣS(n)32.

The correlation calculating unit 73 includes a delay unit 731 for delaying the received signal s(n) by 16 samples and supplying s(n−16), a complex conjugate unit 732 for obtaining the complex conjugate s(n−16)* of s(n−16), a complex multiplication unit 733 for obtaining the product S(n)16 through the complex multiplication of s(n) and s(n−16)*, and an integrator 734 for integrating S(n)16 for 16 samples and supplying the correlation value ΣS(n)16.

The operations of these correlation calculating units will be described by taking the correlation calculating unit 72 as an example. The delay unit 721 delays the input signal s(n) by 32 samples, hence to obtain s(n−32). The complex conjugate unit 722 requires the complex conjugate s(n−32)* of s(n−32), and the complex multiplication unit 723 multiplies s(n) by s(n−32)*, hence to obtain the product S(n)32. The integrator 724 integrates the S(n)32 for 32 samples and obtains the correlation value ΣS(n)32. The same operations are performed also in the correlation calculating units 51 and 53, except that the same units 51 and 53 respectively take 64 samples and 16 samples in the delay amount and the integration sample number.

As illustrated in FIG. 18, the judging/calculating unit 74 includes dividing units 541, 542, and 543 for dividing the imaginary part by the real part, in order to detect the phase, respectively as for the three kinds of the input correlation values, ΣS(n)64, ΣS(n)32, and ΣS(n)16, and supplying the error signals E(n)64, E(n)32, and E(n)16 correspondingly, an error signal selecting unit 544 for selecting an error signal for use in estimating the frequency offset, from the error signals supplied from the dividing units 541, 542, and 543 and supplying this as E(n), an arctangent calculating unit 545 for performing the arctangent calculation on E(n) hence to obtain $\Delta\theta_{EST}$ from E(n) and supply it, and a calculating unit 546 for calculating the frequency offset estimated value $\Delta f_{EST}$ from $\Delta\theta_{EST}$ and N, by using the expression (a). The N is supplied to the calculating unit 546 by the error signal selecting unit 544.

In order to require the phase component of the correlation, the imaginary part of the correlation is divided by the real part. This division is respectively performed on the three kinds of the obtained correlation values ΣS(n)64, ΣS(n)32, and ΣS(n)16 by using the dividing units 541, 542, and 543, and the respective error signals E(n)64, E(n)32, and E(n)16 as for the respective delays are supplied to the error signal selecting unit 544. The error signal selecting unit 544 receives the above error signals E(n)64, E(n)32, and E(n)16, select the most suitable for getting the highest accuracy of frequency offset estimation, and supplies it to the arctangent calculating unit 545 as E(n).

The error signal selecting unit 544 supplies the delay sample number N corresponding to the selected error signal to the calculating unit 546, in order to require the frequency offset estimated value $\Delta f_{EST}$ from $\Delta\theta_{EST}$. Thus obtained E(n) is entered into the arctangent calculating unit 545, and the arctangent calculating unit 545 requires $\Delta\theta_{EST}$ by adopting the following expression (b) to the E(n) supplied from the error signal selecting unit 544, $$\Delta\theta_{EST} = \tan^{-1}(E(n)) \quad (b)$$

and supplies this to the calculating unit 546.

The calculating unit 546 requires $\Delta f_{EST}$ by using $\Delta\theta_{EST}$ input from the arctangent calculating unit 545 and the delay sample number N input from the error signal selecting unit 544 according to the expression (a).

Next, an error signal selection algorithm of the error signal selecting unit 544 will be described. The E(n) can be expressed by the following expressions (c) and (d):

$$E(n) = Im(\Sigma S(n))/Re(\Sigma S(n)) \quad (c)$$

$$E(n) = \tan(\Delta\theta_{EST}) \quad (d).$$

Therefore, when $\Delta\theta_{EST}$ is in the range of $-\pi/2 \leq \Delta\theta_{EST} \leq +\pi/2$, the value of E(n) becomes greater according as the frequency offset becomes larger. According to the following expressions (e), (f), and (g):

$$E(n) = \tan(\Delta\theta_{EST}) \quad (e)$$

$$\Delta\theta_{EST} = 2\pi \cdot 64 T \Delta f_{EST} \quad (f)$$

$$\Delta f_{EST} = \tan^{-1}(E(n))/(2\pi 64 T) \quad (g),$$

When the delay amount is decreased, the drawing frequency range is more expanded. While, when the delay amount is increased, the noise component is suppressed and the estimation accuracy within the drawing frequency range becomes better. By using this characteristic, the values of the E(n)16 and E(n)32 are observed and the error signal E(n) for use in requiring $\Delta\theta_{EST}$ is selected.

Figure 19:
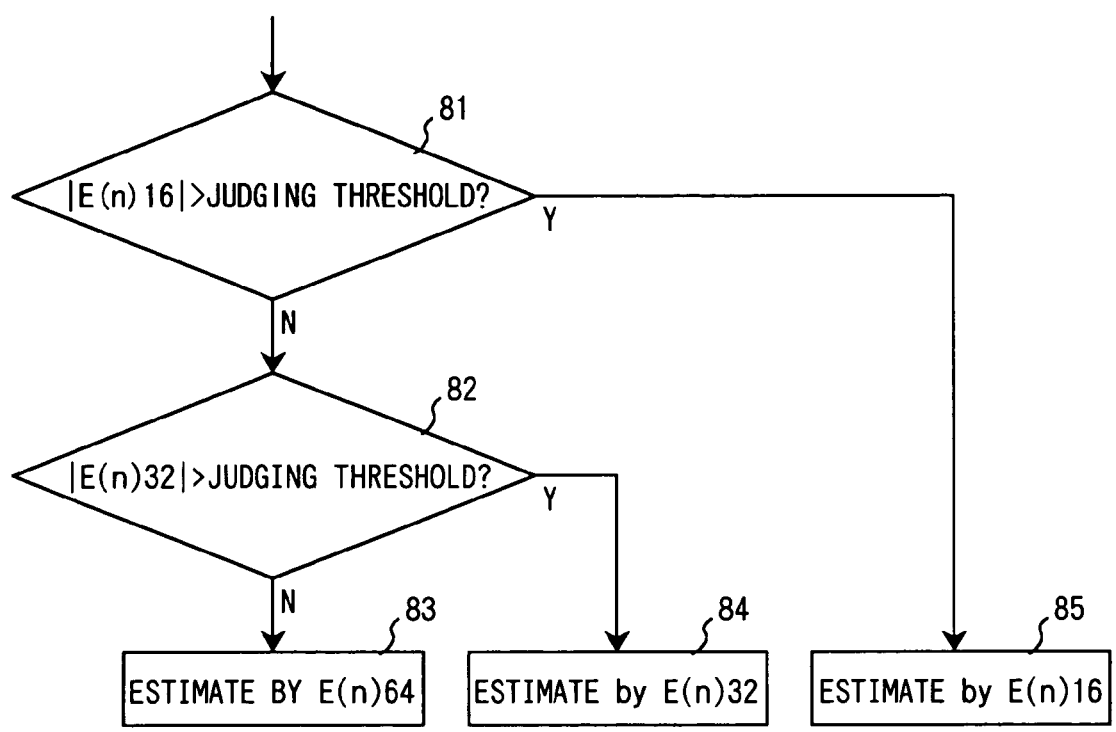
FIG. 19 is a flow chart showing one example of an error signal selection algorism.

The error signal selection algorithm is shown in FIG. 19. At first, the judging threshold is set, and in the processing block 81, it is compared with the absolute value of E(n)16. When the absolute value of E(n)16 is larger than the judging threshold, the frequency offset is judged to be out of the drawing frequency range in the case of estimation by using E(n)32 and estimation is performed by using the widest drawing frequency range E(n)16 (processing block 85). When the judging threshold is equal to or larger than the E(n)16, the absolute value of E(n)32 is compared with the judging threshold in the processing block 82.

When the absolute value of E(n)32 is larger than the judging threshold, the frequency offset is judged to be out of the drawing frequency range in the case of estimation by using E(n)64 and estimation is performed by using the second widest drawing frequency range E(n)32 (processing block 84). When the judging threshold is equal to or larger than the E(n)32 in the processing block 82, the frequency offset is judged to be within the drawing frequency range in the case of estimation by using E(n)64 and estimation is performed by using the E(n)64 of the highest estimation accuracy (processing block 83).

As mentioned above, the invention made by the present inventor has been concretely described based on the embodiments, the invention is not restricted to the above embodiments, but it is needless to say that various modifications are possible within the range of its sprit.

For example, a packet is not restricted to the IEEE802.11a-compliant packet for wireless LANs. The invention can be widely adopted to an OFDM packet conforming to the other standard.

According to the OFDM demodulation method and the OFDM demodulator using the same method of the invention, DC offset can be estimated in an OFDM packet with no nul symbol defined there, thereby improving the OFDM demodulation performance by correcting the DC offset based on the estimated value.

What is claimed is:

1. An OFDM demodulation method comprising:
   receiving an OFDM packet including a preamble and a following data transmission symbol, in which packet a subcarrier interval of the preamble is set wider than the subcarrier interval of the data transmission symbol;
   estimating a DC offset occurring at a receiving side by using the received preamble;
   correcting the DC offset on the received data transmission symbol, based on the estimation result of the DC offset; and
   demodulating the DC offset corrected data transmission symbol.

2. The OFDM demodulation method according to claim 1, further comprising
   correcting a frequency offset of the received preamble, wherein the DC offset is estimated by using the frequency offset corrected preamble.

3. The OFDM demodulation method according to claim 1, wherein
   in the DC offset estimation, low pass filtering is performed on the received preamble with a passband narrower than the subcarrier interval of the preamble.

4. The OFDM demodulation method according to claim 2, in which
   in the DC offset estimation, low pass filtering is performed on the frequency offset corrected preamble, in situation that an arbitrary time of reaching a maximum output value of an oscillator for use in the frequency offset correction is set at zero and that a period of time is set at a range of −T to T, with a passband narrower than the subcarrier interval of the preamble.

5. An OFDM demodulation method comprising:
   receiving an OFDM packet in which a subcarrier interval of a preamble is set wider than a subcarrier interval of a data transmission symbol;
   estimating a frequency offset by using the received preamble and supplying a frequency offset estimated value;
   correcting the frequency offset on the received preamble, according to the frequency offset estimated value;
   estimating a DC offset by using the frequency offset corrected preamble and supplying a DC offset estimated value;
   correcting the DC offset on the data transmission symbol, according to the DC offset estimated value;
   correcting the frequency offset on the DC offset corrected data transmission symbol, according to the frequency offset estimated value; and
   performing OFDM demodulation on a result of the correcting the frequency offset on the DC offset corrected data transmission symbol.

6. The OFDM demodulation method according to claim 5, wherein
   the estimating a DC offset and supplying a DC offset estimated value includes integral filtering.

7. A semiconductor integrated circuit device for receiving and demodulating an OFDM packet including a preamble and a following data transmission symbol, in which packet a subcarrier interval of the preamble is set wider than the subcarrier interval of the data transmission symbol, the device comprising:
   a DC offset estimating unit for estimating a DC offset occurring at a receiving side by using the received preamble;
   a DC offset correcting unit for correcting the DC offset on the received data transmission symbol, according to the estimation result of the DC offset; and
   a demodulating unit for demodulating the DC offset corrected data transmission symbol.

8. The semiconductor integrated circuit device according to claim 7, further comprising:
   a frequency offset correcting unit for correcting a frequency offset of the received preamble, wherein the DC offset correcting unit estimates the DC offset by using the frequency offset corrected preamble.

9. The semiconductor integrated circuit device according to claim 7, wherein
   the DC offset estimating unit includes a low pass filter for passing the received preamble with a passband narrower than the subcarrier interval of the preamble.

10. The semiconductor integrated circuit device according to claim 8, wherein
    the DC offset estimating unit has a low pass filter for passing the frequency offset corrected preamble, in situation that an arbitrary time of reaching a maximum output value of an oscillator for use in the frequency offset correction is set at zero and that a period of time is set at a range of −T to T, with a passband narrower than the subcarrier interval of the preamble.

11. A semiconductor integrated circuit for receiving and demodulating an OFDM packet signal in which a subcarrier interval of a preamble is set wider than the subcarrier interval of a data transmission symbol, the circuit having a frequency offset estimating unit, a frequency offset correcting unit, a DC offset estimating unit, and a DC offset correcting unit, wherein the received OFDM packet signal is supplied to the frequency offset estimating unit, so as to estimate a frequency offset and supply a frequency offset estimated value, the received OFDM packet signal is supplied to the frequency offset correcting unit, so as to correct the frequency offset according to the frequency offset estimated value and supply a frequency offset corrected signal, the frequency offset corrected signal is supplied to the DC offset estimating unit, so as to estimate a DC offset value and supply a DC offset estimated value, and the frequency offset corrected signal is supplied to the DC offset correcting unit, so as to correct the DC offset according to the DC offset estimated value.

* * * * *